(12) United States Patent
Himann

(10) Patent No.: US 11,386,173 B2
(45) Date of Patent: Jul. 12, 2022

(54) PROCESSING USER PROVIDED INFORMATION FOR RANKING INFORMATION MODULES

(71) Applicant: 1974226 ALBERTA LTD., Calgary (CA)

(72) Inventor: Jode Robert Alan Himann, Calgary (CA)

(73) Assignee: 1974226 ALBERTA LTD., Calgary (CA)

(*) Notice: Subject to any disclaimer, the term of this patent is extended or adjusted under 35 U.S.C. 154(b) by 410 days.

(21) Appl. No.: 16/321,364

(22) PCT Filed: Jun. 12, 2017

(86) PCT No.: PCT/CA2017/050718
§ 371 (c)(1),
(2) Date: Jan. 28, 2019

(87) PCT Pub. No.: WO2018/018132
PCT Pub. Date: Feb. 1, 2018

(65) Prior Publication Data
US 2019/0171686 A1    Jun. 6, 2019

Related U.S. Application Data

(60) Provisional application No. 62/368,570, filed on Jul. 29, 2016.

(51) Int. Cl.
*G06F 16/00* (2019.01)
*G06F 16/9535* (2019.01)
(Continued)

(52) U.S. Cl.
CPC .... *G06F 16/9535* (2019.01); *G06F 16/24578* (2019.01); *G06F 16/338* (2019.01); *G06F 16/90332* (2019.01)

(58) Field of Classification Search
CPC ........... G06F 16/9535; G06F 16/90332; G06F 16/338; G06F 16/24578
(Continued)

(56) References Cited

U.S. PATENT DOCUMENTS 7,418,437 B1   8/2008  Marks
8,150,842 B2   4/2012  Brougher et al.
(Continued)

OTHER PUBLICATIONS

Feb. 1, 2018, International Search Report of the International Searching Authority from the Canadian Receiving Office in PCT/CA2017/050718, which is the international application to which this application claims priority.
(Continued)

*Primary Examiner* — Vincent F Boccio
(74) *Attorney, Agent, or Firm* — Kolitch Romano LLP

(57) ABSTRACT

A computer-implemented method of processing user provided information from a plurality of users in a digital network for ranking one or more information modules is described, which involves causing at least one processor to store in memory user assessment weights, each associated with a user of the plurality of users and representing a weight to be applied to information module assessments, receive a proxy nomination message, change the user assessment weight associated with the proxy user based on the proxy nomination message, for one or more information modules: receive information module assessments, generate weighted assessments, each based on one of the information module assessments received and a user assessment weight, aggregate the weighted assessments to generate an aggregated weighted assessment, and rank a set of the plurality of information modules based at least in part on the aggregated weighted assessments. Apparatuses, systems and computer readable media also described.

21 Claims, 23 Drawing Sheets

(51) Int. Cl.
*G06F 16/9032* (2019.01)
*G06F 16/338* (2019.01)
*G06F 16/2457* (2019.01)

(58) Field of Classification Search
USPC .......................................................... 707/706
See application file for complete search history.

(56) References Cited

U.S. PATENT DOCUMENTS

| | | | |
|---|---|---|---|
| 8,296,293 | B2 | 10/2012 | Minogue et al. |
| 8,484,181 | B2 | 7/2013 | Levin et al. |
| 8,606,792 | B1 | 12/2013 | Jackson et al. |
| 8,751,559 | B2 | 6/2014 | Richardson et al. |
| 2001/0047290 | A1 | 11/2001 | Petras et al. |
| 2004/0019807 | A1* | 1/2004 | Freund .................. H04L 63/145 726/1 |
| 2004/0210602 | A1* | 10/2004 | Hillis ..................... G06Q 50/10 |
| 2005/0149383 | A1 | 7/2005 | Zacharia et al. |
| 2008/0077461 | A1 | 3/2008 | Glick |
| 2008/0097915 | A1* | 4/2008 | Golan ................ G06Q 30/0273 705/51 |
| 2013/0091141 | A1 | 4/2013 | Mishra et al. |
| 2013/0124268 | A1 | 5/2013 | Hatton et al. |
| 2013/0246327 | A1 | 9/2013 | Tabrizi |
| 2014/0040372 | A1 | 2/2014 | Kamimaeda et al. |
| 2015/0006261 | A1* | 1/2015 | Gutman ................. G16H 40/20 705/7.39 |
| 2015/0058380 | A1 | 2/2015 | Polonsky et al. |
| 2016/0027129 | A1 | 1/2016 | Pallaghy et al. |
| 2016/0202915 | A1* | 7/2016 | Strahm ................. G06F 3/0605 711/156 |

OTHER PUBLICATIONS

Feb. 1, 2018, Written Opinion of the International Searching Authority from the Canadian Receiving Office in PCT/CA2017/050718, which is the international application to which this application claims priority.

Jan. 29, 2019, International Preliminary Reporton Patentability of the International Searching Authority from the Canadian Receiving Office in PCT/CA2017/050718, which is the international application to which this application claims priority.

"Vouch. Personal Loans From a Company that Knows You Like A Friend," Vouch Financial Inc., Accessed Mar. 3, 2016 from https://vouch.com.

\* cited by examiner

250 User Record

- 252 — User ID 01234567
- 254 — User Assessment Weight 1.0
- 256 — Name Jane
- 258 — Surname Smith
- 260 — Username jsmith
- 262 — Password F89...A8E
- 264 — Proxy Count 0
- 266 — Nominator Count 0
- 268 — Experience Value 0
- 270 — Engagement Value 0

Information Request Record

352 ~ Information Request ID 00112233
354 ~ Subject Purchasing LED lights
356 ~ Description Where should I purchase LED lights?
358 ~ Proxy Count 3
360 ~ Response 1 Location 1
362 ~ Response 2 Location 2
364 ~ Response 3 Location 3
366 ~ Response 4 Location 4
368 ~ Expiry Date 201608010000

Proxy Nomination Record

422~ Information Request ID 00112233
424~ Proxy ID 01235807
426~ Nominating User ID 01234567
428~ Nomination Time 201607081500

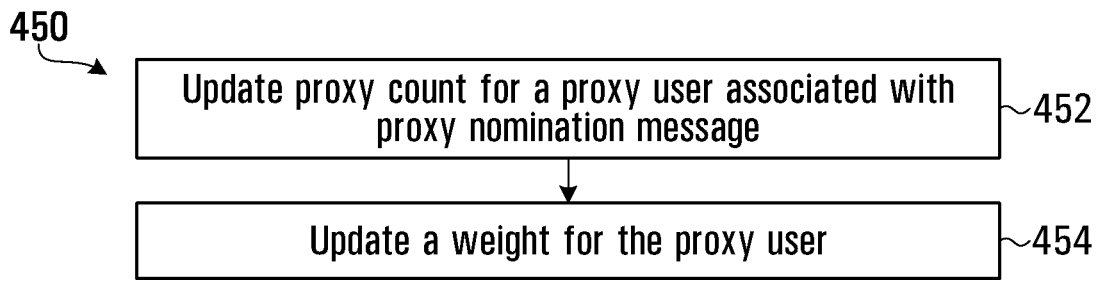
FIG. 15
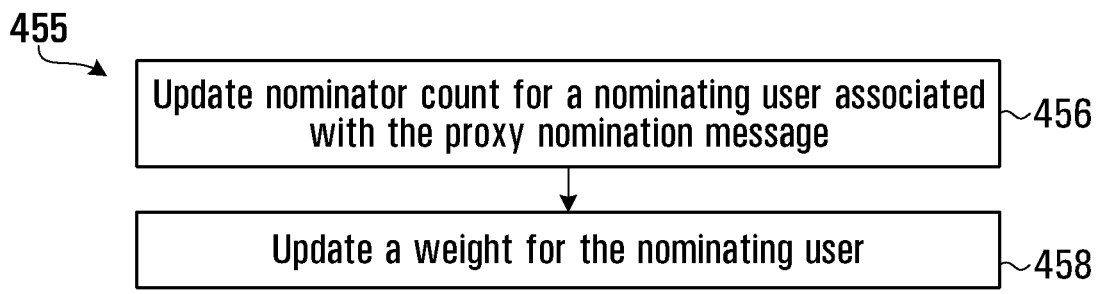
FIG. 16
480
User Record
482~                 User ID 01235807
486~ User Assessment Weight 1.0
                         Name Jode
                Surname Himann
               Username jhimann
              Password E93 ... B68
484~       Proxy Count 0
488~   Nominator Count 0
490~   Experience Value 0
492~   Engagement Value 0
FIG. 17

480

User Record

482 — User ID 01235807
486 — User Assessment Weight 1.5
Name Jode
Surname Himann
Username jhimann
Password E93 ... B68
484 — Proxy Count 1
488 — Nominator Count 0
490 — Experience Value 0
492 — Engagement Value 0

User Record

User ID 01235807
User Assessment Weight 2.0
Name Jane
Surname Smith
Username jsmith
Password F89 ... A8E
Proxy Count 0
Nominator Count 1
Experience Value 0
Engagement Value 0

Information Module Record

562~ Information Module ID 11234567
564~ Title LED Lights
566~ Description The following are some good stores for purchasing LED lights...
570~ Aggregated weighted assessment 8.0

568 {
  User assessment ID 01235801
  User assessment ID 01234802
  User assessment ID 01124306
  User assessment ID 02101414
  User assessment ID 01126306
  User assessment ID 01234556
  User assessment ID 01122445

Information Module Assessment Record

622 ~ Information Module ID 11234567
624 ~     User Assessment ID 01235807

Information Module Record

Information Module ID 11234567
Title LED Lights
Description The following are some good stores for purchasing LED lights...
Aggregated weighted assessment 9.5
User Assessment ID 01235801
User Assessment ID 01234802
User Assessment ID 01124306
User Assessment ID 02101414
User Assessment ID 01126306
User Assessment ID 01234556
User Assessment ID 01122445
User Assessment ID 01235807

Response Record

682 — Information Request ID 00112233
684 — Submitting User ID 01235807
686 — Response Location 1

680

Response Record

Information Request ID 00112233
Submitting User ID 01235807
Response Location 1
688 ~ User Response Weight 2.4

Information Request Record

Information Request ID 00112233
Subject Purchasing LED lights
Description Where should I purchase LED lights?
Proxy Count 4
360 ~ Response 1 Location 1
361 ~ Response Score 40.4
362 ~ Response 2 Location 2
363 ~ Response Score 1.0
364 ~ Response 3 Location 3
365 ~ Response Score 2.4
366 ~ Response 4 Location 4
367 ~ Response Score 4.8
Expiry Date 201608010000

FIG. 32

PROCESSING USER PROVIDED INFORMATION FOR RANKING INFORMATION MODULES

CROSS-REFERENCES

This application claims the benefit of U.S. Provisional Application No. 62/368,570 entitled "PROCESSING USER PROVIDED INFORMATION FOR RANKING INFORMATION MODULES", filed on Jul. 29, 2016, which is hereby incorporated by reference herein in its entirety.

INTRODUCTION

1. Field

This disclosure relates to processing user provided information and more particularly to processing user provided information for ranking information modules.

2. Description of Related Art

A large proportion of a group, business, organization, or society's value may rest in the knowledge and expertise of its members or employees. Some computer systems may be configured to try to understand and/or utilize the knowledge of members or employees. For example, organizations may implement computer systems which facilitate communication with employees. This may include, for example, a computer system for bug reports or wiki entries that can be used by employees to request and/or offer knowledge on various subjects. However, these computer systems may suffer from various drawbacks.

SUMMARY

The disclosure describes a computer-implemented method of processing user provided information from a plurality of users in a digital network for ranking one or more information modules. The method involves causing at least one processor to store in memory respective user assessment weights, each of the user assessment weights associated with a user of the plurality of users and representing a weight to be applied to information module assessments, causing the at least one processor to receive a proxy nomination message including a proxy user identifier identifying a proxy user that a nominating user of the plurality of users wishes to act as a proxy in providing information, and causing the at least one processor to change the user assessment weight associated with the proxy user based on the proxy nomination message. The method also involves causing the at least one processor to, for one or more information modules of the plurality of information modules: receive information module assessments, each of the information module assessments associated with a user of the plurality of users, generate weighted assessments, each of the weighted assessments based on one of the information module assessments received and a user assessment weight associated with a user associated with the information module assessment, and aggregate the weighted assessments to generate an aggregated weighted assessment associated with the information module. The method also involves causing the at least one processor to rank a set of the plurality of information modules based at least in part on the aggregated weighted assessments.

The method may further involve causing the at least one processor to produce signals for causing at least one ranking display to display the set of the plurality of information modules in an order based on the ranking.

Causing the at least one processor to update the user assessment weight associated with the proxy user may involve causing the at least one processor to increase the user assessment weight associated with the proxy user.

The method may further involve causing the at least one processor to update the user assessment weight associated with the nominating user based on the proxy nomination message.

The method may further involve causing the at least one processor to, for each of the plurality of users: determine the user assessment weight value for the user based on an experience value representing a formal position of the user.

The method may further involve causing the at least one processor to receive a search query and causing the at least one processor to rank the set of the plurality of information modules may involve causing the at least one processor to rank the set of the plurality of information modules based at least in part on the search query.

The method may further involve: causing the at least one processor to receive a plurality of responses to the inquiry, each of the responses associated with one of the plurality of users, wherein the plurality of responses may involve one or more sets of corresponding responses, and causing the at least one processor to determine a score for each set of corresponding responses.

The method may further involve causing the at least one processor to, for each of the responses received: update a user engagement value for the user associated with the response, and determine the user assessment weight value for the user associated with the response based on the updated user engagement value.

The method may further involve: causing the at least one processor to determine user response weights, each of the user response weights associated with a user of the plurality of users and representing a weight to be applied to a response to the inquiry provided by the user, the user response weight associated with the proxy user determined based on the proxy nomination message. Causing the at least one processor to determine the score for each set of corresponding responses may involve aggregating user response weights associated with corresponding responses.

The method may further involve causing the at least one processor to produce signals for causing at least one response score display to display a representation of the scores.

Causing the at least one processor to determine the user response weight associated with the proxy user may involve causing the at least one processor to determine a proxy weight modification value.

Causing the at least one processor to determine the proxy weight modification value may involve causing the at least one processor to determine a user response weight associated with the nominating user and causing the at least one processor to derive the proxy weight modification value from the determined user response weight associated with the nominating user.

Causing the at least one processor to derive the proxy weight modification value may involve: causing the at least one processor to set the proxy weight modification value to a sum of the user response weight associated with the nominating user and a proxy modifier.

The method may further involve causing the at least one processor to determine a nominator modifier associated with the nominating user and causing the at least one processor to derive the proxy modifier based on the nominator modifier.

The proxy modifier may be greater than the nominator modifier

The method may further involve causing the at least one processor to produce signals representing an information request for causing at least one information request display to present the information request to the nominating user and the proxy user identifier of the proxy nomination message may identify the proxy user as a user that the nominating user of the plurality of users wishes to act as a proxy for the nominating user for responding to the information request.

The method may further involve causing the at least one processor to produce signals for causing a proxy nomination to be stored in memory, the proxy nomination including an identification of the proxy user and an identification of the nominating user and representing the nomination of the proxy user by the nominating user.

The disclosure also describes an apparatus for processing user provided information from a plurality of users in a digital network for ranking one or more information modules. The apparatus includes at least one processor configured to store in memory respective user assessment weights, each of the user assessment weights associated with a user of the plurality of users and representing a weight to be applied to information module assessments, receive a proxy nomination message including a proxy user identifier identifying a proxy user that a nominating user of the plurality of users wishes to act as a proxy in providing information, and change the user assessment weight associated with the proxy user based on the proxy nomination message. The at least one processor is also configured to for one or more information modules of the plurality of information modules: receive information module assessments, each of the information module assessments associated with a user of the plurality of users, generate weighted assessments, each of the weighted assessments based on one of the information module assessments received and a user assessment weight associated with a user associated with the information module assessment, and aggregate the weighted assessments to generate an aggregated weighted assessment associated with the information module. The at least one processor is also configured to rank a set of the plurality of information modules based at least in part on the aggregated weighted assessments.

The at least one processor may be configured to produce signals for causing at least one ranking display to display the set of the plurality of information modules in an order based on the ranking.

The at least one processor may be configured to update the user assessment weight associated with the proxy user by increasing the user assessment weight associated with the proxy user.

The at least one processor may be configured to update the user assessment weight associated with the nominating user based on the proxy nomination message.

The at least one processor may be configured to, for each of the plurality of users: determine the user assessment weight value for the user based on an experience value representing a formal position of the user.

The at least one processor may be configured to receive a search query and the at least one processor may be configured to rank the set of the plurality of information modules by ranking the set of the plurality of information modules based at least in part on the search query.

The at least one processor may be configured to: receive a plurality of responses to the inquiry, each of the responses associated with one of the plurality of users, wherein the plurality of responses may include one or more sets of corresponding responses, and determine a score for each set of corresponding responses.

The at least one processor may be configured to, for each of the responses received: update a user engagement value for the user associated with the response, and determine the user assessment weight value for the user associated with the response based on the updated user engagement value.

The at least one processor may be configured to determine user response weights, each of the user response weights associated with a user of the plurality of users and representing a weight to be applied to a response to the inquiry provided by the user, the user response weight associated with the proxy user determined based on the proxy nomination message. The at least one processor may be configured to determine the score for each set of corresponding responses by aggregating user response weights associated with corresponding responses.

The at least one processor may be configured to produce signals for causing at least one response score display to display a representation of the scores.

The at least one processor may be configured to determine the user response weight associated with the proxy user by determining a proxy weight modification value.

The at least one processor may be configured to determine the proxy weight modification value by determining a user response weight associated with the nominating user and deriving the proxy weight modification value from the determined user response weight associated with the nominating user.

The at least one processor may be configured to derive the proxy weight modification value by setting the proxy weight modification value to a sum of the user response weight associated with the nominating user and a proxy modifier.

The at least one processor may be configured to determine a nominator modifier associated with the nominating user and derive the proxy modifier based on the nominator modifier.

The proxy modifier may be greater than the nominator modifier

The at least one processor may be configured to produce signals representing an information request for causing at least one information request display to present the information request to the nominating user and the proxy user identifier of the proxy nomination message identifies the proxy user as a user that the nominating user of the plurality of users wishes to act as a proxy for the nominating user for responding to the information request.

The at least one processor may be configured to produce signals for causing a proxy nomination to be stored in memory, the proxy nomination including an identification of the proxy user and an identification of the nominating user and representing the nomination of the proxy user by the nominating user.

The disclosure also describes a system for processing user provided information from a plurality of users in a digital network for ranking one or more information modules. The system includes provisions for storing in memory respective user assessment weights, each of the user assessment weights associated with a user of the plurality of users and representing a weight to be applied to information module assessments, provisions for receiving a proxy nomination message including a proxy user identifier identifying a proxy user that a nominating user of the plurality of users wishes to act as a proxy in providing information, and provisions for changing the user assessment weight associated with the proxy user based on the proxy nomination message. The system also includes provisions for, for one or more information modules of the plurality of information modules: receiving information module assessments, each of the information module assessments associated with a user of the plurality of users, generating weighted assessments, each of the weighted assessments based on one of the information module assessments received and a user assessment weight associated with a user associated with the information module assessment, and aggregating the weighted assessments to generate an aggregated weighted assessment associated with the information module. The system also includes provisions for ranking a set of the plurality of information modules based at least in part on the aggregated weighted assessments.

The system may further include provisions for causing at least one ranking display to display the set of the plurality of information modules in an order based on the ranking.

The provisions for updating the user assessment weight associated with the proxy user may include provisions for increasing the user assessment weight associated with the proxy user.

The system may further include provisions for updating the user assessment weight associated with the nominating user based on the proxy nomination message.

The system may further include provisions for, for each of the plurality of users, determining the user assessment weight value for the user based on an experience value representing a formal position of the user.

The system may further include provisions for receiving a search query and the provisions for ranking the set of the plurality of information modules may include provisions for ranking the set of the plurality of information modules based at least in part on the search query.

The system may further include: provisions for receiving a plurality of responses to the inquiry, each of the responses associated with one of the plurality of users, wherein the plurality of responses may include one or more sets of corresponding responses, and provisions for determining a score for each set of corresponding responses.

The system may further include provisions for, for each of the responses received: updating a user engagement value for the user associated with the response, and determining the user assessment weight value for the user associated with the response based on the updated user engagement value.

The system may further include provisions for determining user response weights, each of the user response weights associated with a user of the plurality of users and representing a weight to be applied to a response to the inquiry provided by the user, the user response weight associated with the proxy user determined based on the proxy nomination message. The provisions for determining the score for each set of corresponding responses may include provisions for aggregating user response weights associated with corresponding responses.

The system may further include provisions for causing at least one response score display to display a representation of the scores.

The system may further include provisions for determining the user response weight associated with the proxy user by determining a proxy weight modification value.

The provisions for determining the proxy weight modification value may include provisions for determining a user response weight associated with the nominating user and provisions for deriving the proxy weight modification value from the determined user response weight associated with the nominating user.

The provisions for deriving the proxy weight modification value may include provisions for setting the proxy weight modification value to a sum of the user response weight associated with the nominating user and a proxy modifier.

The system may further include provisions for determining a nominator modifier associated with the nominating user and provisions for deriving the proxy modifier based on the nominator modifier.

The proxy modifier may be greater than the nominator modifier

The system may further include provisions for producing signals representing an information request for causing at least one information request display to present the information request to the nominating user and the proxy user identifier of the proxy nomination message may identify the proxy user as a user that the nominating user of the plurality of users wishes to act as a proxy for the nominating user for responding to the information request.

The system may further include provisions for producing signals for causing a proxy nomination to be stored in memory, the proxy nomination including an identification of the proxy user and an identification of the nominating user and representing the nomination of the proxy user by the nominating user.

The disclosure also describes a computer readable medium having stored thereon codes which, when executed by at least one processor, cause the at least one processor to perform any of the above methods Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 6 is a representation of an exemplary first user record that may be used in the system shown in FIG. 1;

FIG. 11 is a representation of an exemplary first information request record that may be used in the system shown in FIG. 1;

FIG. 15 is a flowchart depicting blocks of code which may be included in the blocks of code shown in FIG. 5 in accordance with an embodiment of the invention;

FIG. 16 is a flowchart depicting blocks of code which may be included in the blocks of code shown in FIG. 5 in accordance with an embodiment of the invention;

FIG. 17 is a representation of an exemplary second user record that may be used in the system shown in FIG. 1;

FIG. 18 is a representation of an exemplary updated second user record that may be used in the system shown in FIG. 1;

FIG. 19 is a representation of an exemplary updated first user record that may be used in the system shown in FIG. 1;

FIG. 22 is a representation of an exemplary first information module record that may be used in the system shown in FIG. 1;

FIG. 24 is a representation of an exemplary information module assessment record that may be used in the system shown in FIG. 1;

FIG. 25 is a representation of an exemplary updated first information module record that may be used in the system shown in FIG. 1;

FIG. 31 is a representation of an exemplary response record that may be used in the system shown in FIG. 1;

FIG. 32 is a representation of an exemplary updated first information request record that may be used in the system shown in FIG. 1;

DETAILED DESCRIPTION

Aspects, features and embodiments of the invention are described with reference to illustrative embodiments and figures. Generally, there are provided methods, systems and apparatuses for processing user provided information.

Figure 1:
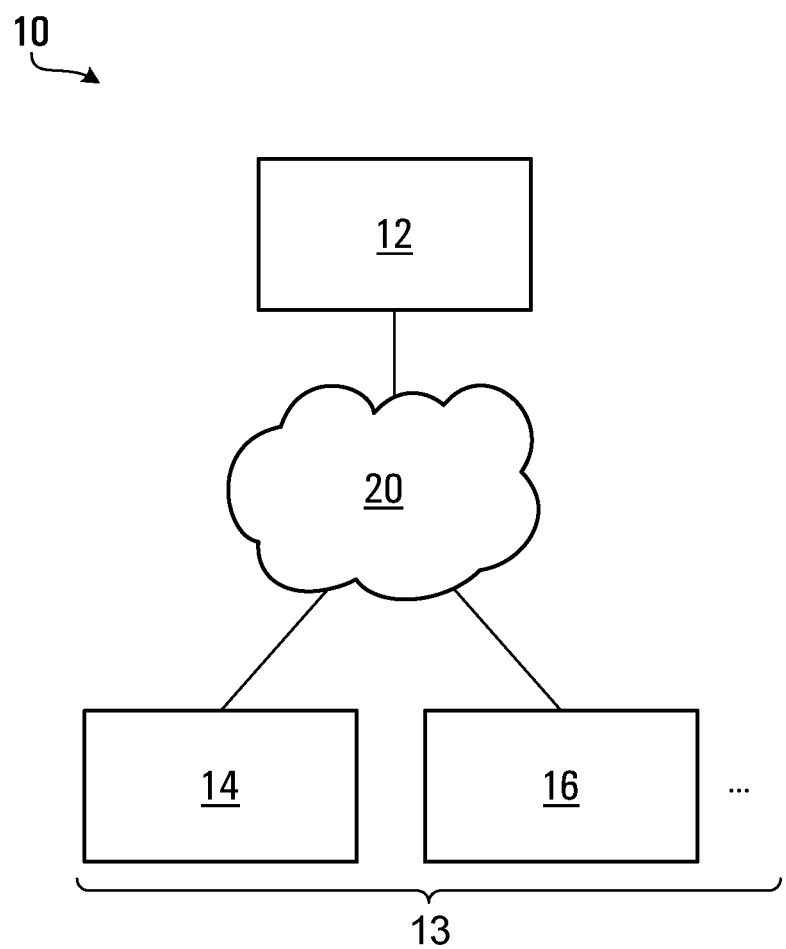
FIG. 1 is a schematic view of a system for processing user provided information for ranking one or more information modules in accordance with an embodiment of the invention.

Referring to FIG. 1, according to one embodiment of the invention, there is provided a system 10 for processing user provided information for ranking one or more information modules. The system 10 includes a server 12 and one or more user devices 13, which for illustration purposes, in the embodiment shown in FIG. 1 includes a first user device 14 and a second user device 16, each of which is in communication with the server 12 via a network 20.

In some embodiments, the network 20 may be a private network. In some embodiments, the network 20 may be a public network and may include or be connected to the Internet, for example. The system 10 may be implemented by a group or organization, for example, for use by employees or users which may access the system 10 via the one or more user devices 13. Each of the one or more user devices 13 may be configured to access functionality provided by the server 12 via, for example, a data processing application running on the user device which may include code for generally providing web browser functionality.

While the one or more user devices 13 shown in FIG. 1 includes a plurality of user devices, in various embodiments, the system 10 may include any number of user devices and may in some embodiments include a single user device.

Referring to FIG. 1, in various embodiments, the server 12 may be configured to store representations of information modules or posts, which in some embodiments may be provided by users. The information modules may include information that could be helpful to a user, such as an employee to improve their job performance, for example. In some embodiments, the information modules may be searchable and a searching user may wish to search the posts for information that may be relevant to them or their job, for example, and so the user may interact with one of the user devices 13 to initiate the search, such as by providing search terms or a search query.

Users may be able to review the information modules by providing user assessments and the server 12 may be configured to rank or order the information modules based at least in part on received user assessments. For example, a "like" or indication that the user approves of a post may act as a user assessment. In various embodiments, not all user assessments provided by the users may be weighted equally in the system 10. Rather, the server 12 may be configured to store in memory respective user assessment weights associated with users of the system 10, each user assessment weight representing a weight to be applied to information module assessments received from or associated with that user. In some embodiments, the user assessment weights may be initialized to a default value but may be modified based on one or more factors, considerations, and/or events.

For example, the user assessment weights may be changed or updated based on a count of how often a particular user is nominated as a proxy user by another user for responding to a question or information request. In various embodiments, the server 12 may be configured to provide information requests or questions to the users via the network 20 and the one or more user devices 13 and the system 10 may facilitate users choosing between responding to the information requests and nominating a user that the nominating user wishes to act as a proxy in responding to the information request. Nominating another user to act as a proxy may act as a transfer of a vote. In some embodiments, a user may cause a user device to send a proxy nomination message to the server indicating that the user wishes to nominate a proxy user and the server 12 may be configured to receive the proxy nomination message and change or increase a user assessment weight associated with the nominated proxy user based on the nomination.

In various embodiments, the server 12 may be configured to receive information module assessments, each of the information module assessments associated with a user. For example, in some embodiments, one or more of the users may indicate that they approve of a particular information module by selecting a "like" link or icon associated with the information module and the selection of the "like" link may act as a positive user assessment.

The server 12 may be configured to generate weighted assessments based on the information module assessments received and a user assessment weight associated with a user associated with the information module assessment. For example, the server 12 may be configured to generate more persuasive or weighted assessments for user assessments associated with users having higher associated user assessment weights and in some embodiments a "like" received from a user with a relatively high user assessment weight may be assigned a higher weighted value than a "like" received from a user with relatively low user assessment weight.

The server 12 may be configured to, for each information module, aggregate the weighted assessments to generate an aggregated weighted assessment associated with the information module. The aggregated weighted assessment may act as a score or rating for the information module, for example.

A user may browse or search the information modules and the server 12 may be configured to rank one or more of the information modules based at least in part on the aggregated weighted assessments. In various embodiments, the aggregated weighted assessments may be used to modify search results which are displayed to the users.

As discussed above, the server 12 may be configured to provide information requests or questions to the users via the network 20 and the one or more user devices 13 and the system 10 may facilitate users choosing between responding to the information requests and nominating a user that the nominating user wishes to act as a proxy in responding to the information request. In some embodiments, the server 12 may be configured to use proxy nominations and responses to determine scores for responses to the information requests. In some embodiments, this may help a user or administrator determine which responses are preferred responses.

As discussed above, the server 12 may be configured to receive the proxy nomination message and change or increase a user assessment weight associated with the nominated proxy user based on the nomination. In some embodiments, the server 12 may be configured to receive a response including a user identifier identifying the submitting or responding user and to store a representation of the response in memory.

The server 12 may be configured to determine or calculate scores for the responses to a particular information request when triggered. For example, the server 12 may be triggered when an expiry date associated with the information request passes. The server 12 may then be configured to determine a user response weight for each of the received responses and to aggregate the user response weights to determine a score for one or more sets of corresponding responses.

In some embodiments, the server 12 may be configured to determine the user response weight for each response by determining whether the submitting user was nominated by a proxy and if so, adding a proxy modification value to a default value to determine the user response weight. The server 12 may be configured to, if the submitting user was not nominated by a proxy, set the user response weight to the default weight. The server 12 may be configured to set the proxy modification value to the sum of a user response weight associated with the nominating user and a modifier. In some embodiments, a proxy nomination may act to facilitate transferring of a vote or ability to respond from the nominating user to the proxy user.

In some embodiments, a proxy user may act as a nominating user by transferring their vote or ability to respond to another user, who may do the same. Accordingly, the system 10 may facilitate transferring votes multiple times such that the vote can be passed to a plurality of members in a group. In various embodiments, the amount of weight given to a transferred vote may change value or increase with every transfer.

The user response weight applied to a user who was nominated as a proxy may be greater than the total combined weights which would have been applied to the nominating user and the proxy user. In various embodiments, this may facilitate more accurate scoring of responses, since in some cases it may be assumed that a user who has been nominated as a proxy may provide a more useful response than two users who have not been nominated proxies.

First User Device—Processor Circuit

Figure 2:
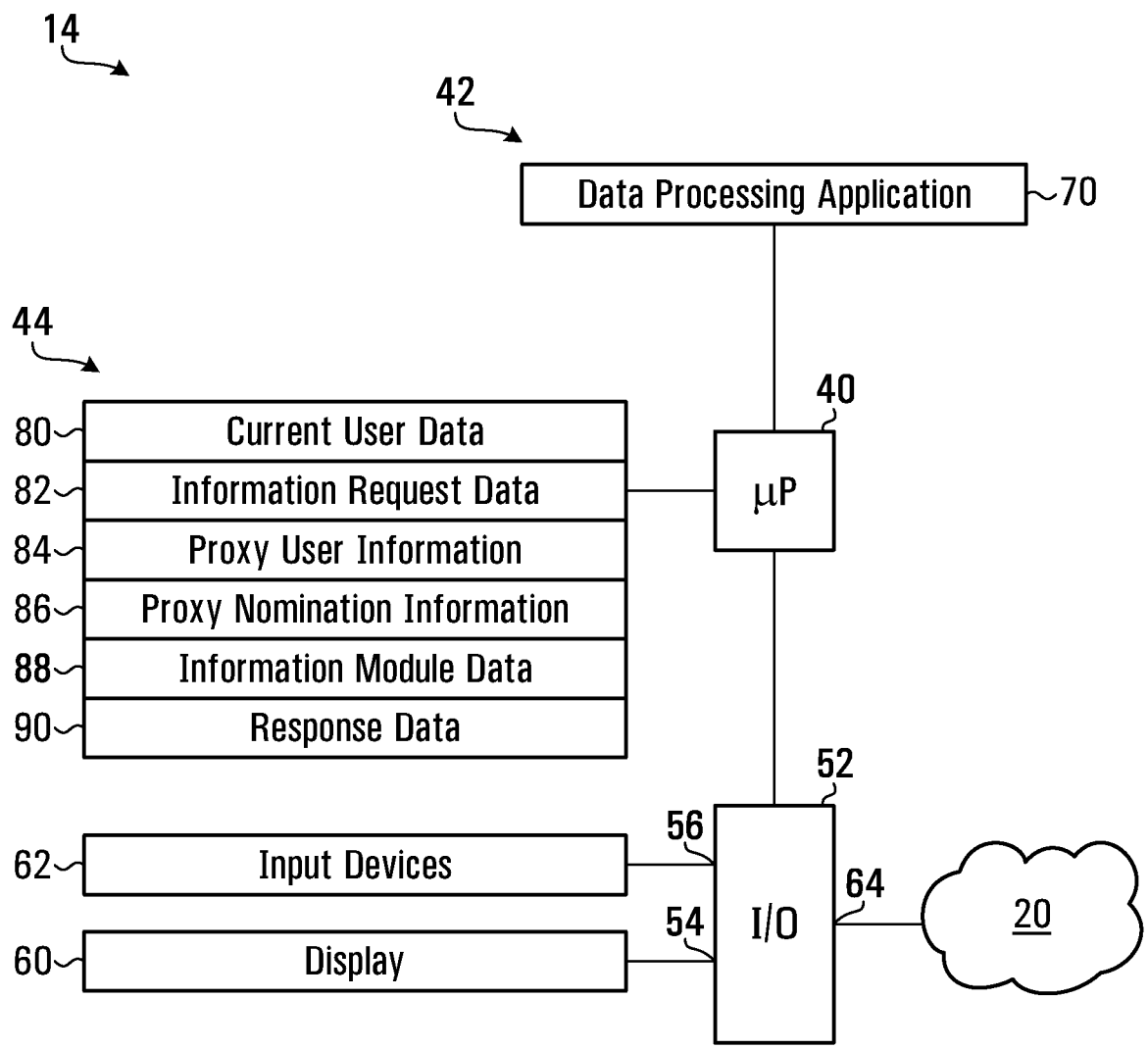
FIG. 2 is a schematic view of a first user device shown in the system of FIG. 1 including a processor circuit in accordance with an embodiment of the invention.

Referring to FIG. 2, a schematic view of the first user device 14 shown in FIG. 1 according to one embodiment is shown. The first user device 14 may be implemented as a device which can provide a user interface for a user for interacting with the server 12. For example, in various embodiments, the first user device 14 may include any of a variety of one or more computing or display devices including, for example, a PC, a smartphone, a tablet, a laptop, or another form of computing device and/or any combination thereof. In one embodiment, the first user device 14 may be implemented as a personal computer (PC) having a data processing application installed thereon which may facilitate web browsing functions.

Referring still to FIG. 2, the first user device 14 includes a processor circuit including a first user device processor 40 and a program memory 42, a storage memory 44, and an input/output (I/O) interface 52, all of which are in communication with the first user device processor 40. The first user device 14 also includes a display 60 and one or more user input devices 62. In various embodiments, the one or more user input devices 62 may include, for example, a pointing device, such as a mouse, and/or a keyboard. In some embodiments, the one or more user input devices 62 may be integrated with the display 60 and/or may include a touch screen, for example. The I/O interface 52 includes an interface 54 for communicating with the display 50 and an interface 56 for communicating with the user input devices 62. The I/O interface 52 also includes an interface 64 for communicating via the network 20 with the server 12 shown in FIG. 1, for example.

In some embodiments, the interface 64 may facilitate networked communication through the network 20 shown in FIG. 1 and may include a network interface having a network interface card with an input/output for connecting to the network 20 through which communications may be conducted with devices connected to the network. Other network interfaces described or shown herein may include generally similar elements.

Program codes for directing the first user device processor 40 to carry out various functions are stored in the program memory 42. The program memory 42 includes a block of codes 70 for directing the first user device 14 to effect data processing functions. In various embodiments, the block of codes 70 may include codes of directing the first user device 14 to effect web browser functionality. The storage memory 44 includes a plurality of storage locations including location 80 for storing current user data, location 82 for storing information request data, location 84 for storing proxy user information, location 86 for storing proxy nomination information, location 88 for storing information module data, and location 90 for storing response data. In various embodiments, the block of codes 70 may include one or more blocks of code stored in one or more locations in memory and/or one or more of the locations 80-90 may include one or more locations in memory. In various embodiments, the plurality of storage locations may be stored in a database in the storage memory 44.

In various embodiments, each of the program memory 42 and storage memory 44 may be implemented as one or more storage devices including random access memory (RAM), a hard disk drive (HOD), a solid-state drive (SSD), a network drive, flash memory, a memory stick or card, any other form of computer-readable memory or storage medium, and/or a combination thereof. In some embodiments, the program memory 42, the storage memory 44, and/or any portion thereof may be included in a device separate from the first user device 14 and in communication with the first user device 14 via the I/O interface 52, for example. In various embodiments, other program memory, blocks of code, storage memory, and locations in memory described herein may be implemented generally similarly to as described above for the program memory 42 and the storage memory 44.

Second User Device—Processor Circuit

Figure 3:
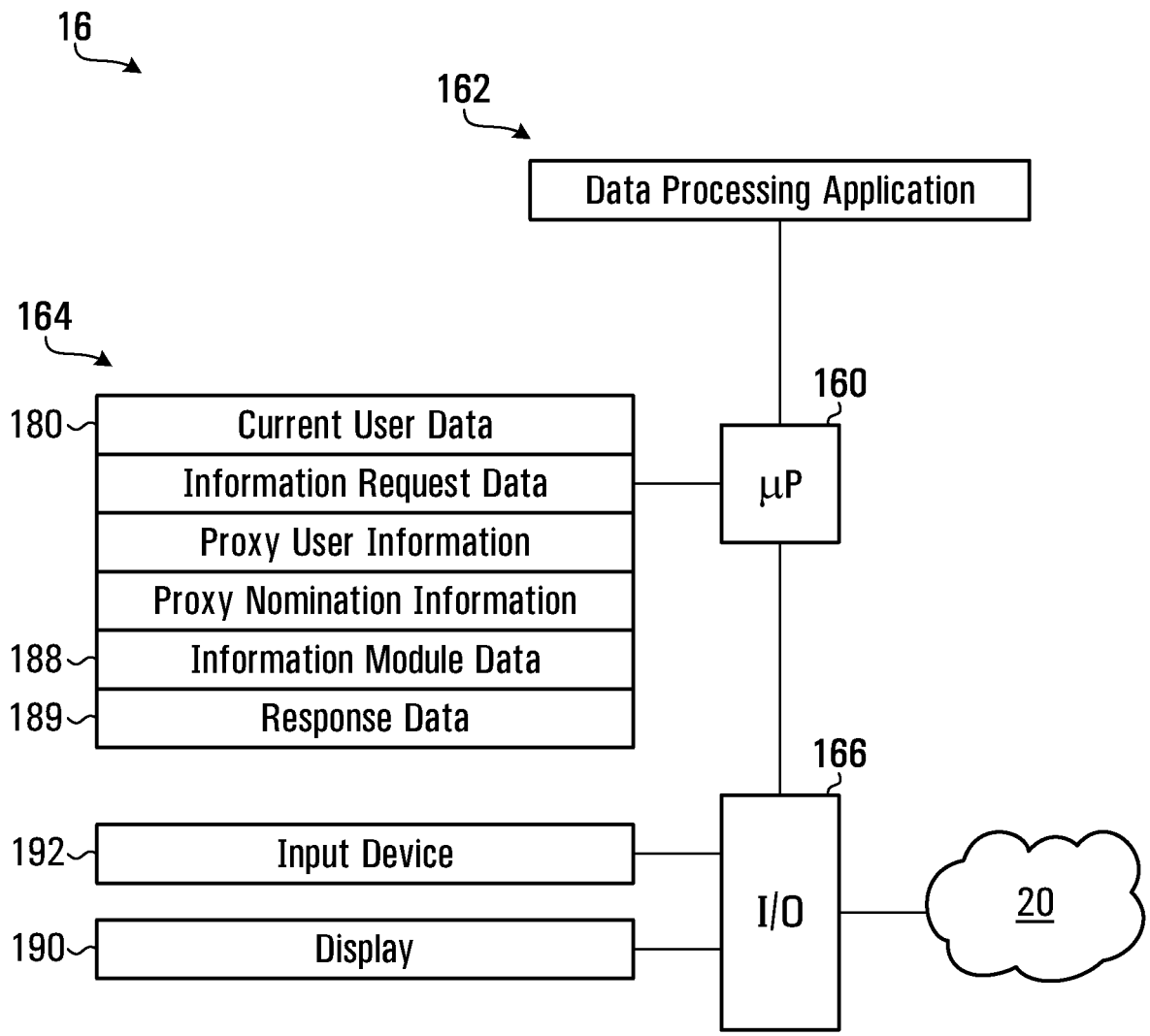
FIG. 3 is a schematic view of a second user device shown in the system of FIG. 1 including a processor circuit in accordance with an embodiment of the invention.

Referring to FIG. 3 a schematic view of the second user device 16 shown in FIG. 1 according to one embodiment is shown. The second user device 16 may be implemented generally similarly to as described above having regard to the first user device 14 shown in FIG. 2.

Referring to FIG. 3, the second user device 16 includes a processor circuit including a second user device processor 160 and a program memory 162, a storage memory 164, and an input/output (I/O) interface 166, all of which are in communication with the second user device processor 160. The second user device 16 also includes a display 190 and one or more user input devices 192.

Server—Processor Circuit

Figure 4:
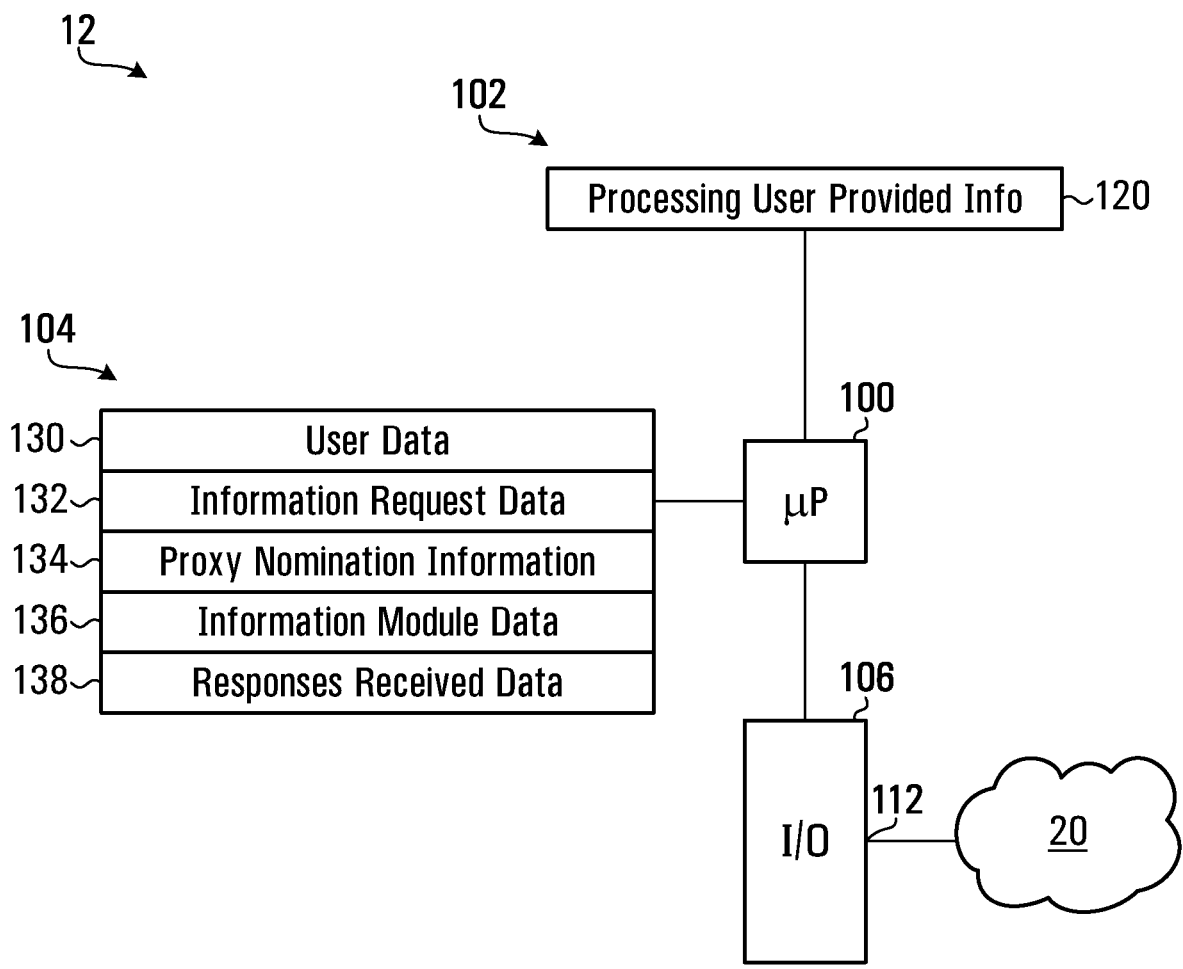
FIG. 4 is a schematic view of a server shown in the system of FIG. 1 including a processor circuit in accordance with an embodiment of the invention.

Referring to FIG. 4, a schematic view of the server 12 shown in FIG. 1 according to one embodiment is shown. In the embodiment shown, the server 12 includes a processor circuit including a server processor 100 and a program memory 102, a storage memory 104, and an input/output (I/O) interface 106 all of which are in communication with the server processor 100.

The I/O interface 106 includes an interface 112 for communicating with devices, such as the one or more user devices 13, for example, via the network 20.

Program codes for directing the server processor 100 to carry out various functions are stored in the program memory 102. In various embodiments, the program memory 102 may include a block of codes 120 for directing the server 12 to process user provided information. The block of codes 120 may define an information processing application. In this specification, it may be stated that certain encoded entities such as applications perform certain functions. Whenever an application or encoded entity is described as taking an action, as part of, for example, a process, a function or a method, it will be understood that a processor (e.g. the server processor 100) is directed to take the action by way of programmable codes or processor readable instructions defining or forming part of the application and/or cause another component, for example a part of the system 10 shown in FIG. 1, to take the action.

The storage memory 104 includes a plurality of storage locations including location 130 for storing user data, location 132 for storing information request data, location 134 for storing proxy nomination information, location 136 for storing information module data, and location 138 for storing responses received data. In various embodiments, the plurality of storage locations may be stored in a database in the storage memory 104.

Information Module Ranking

Figure 5:
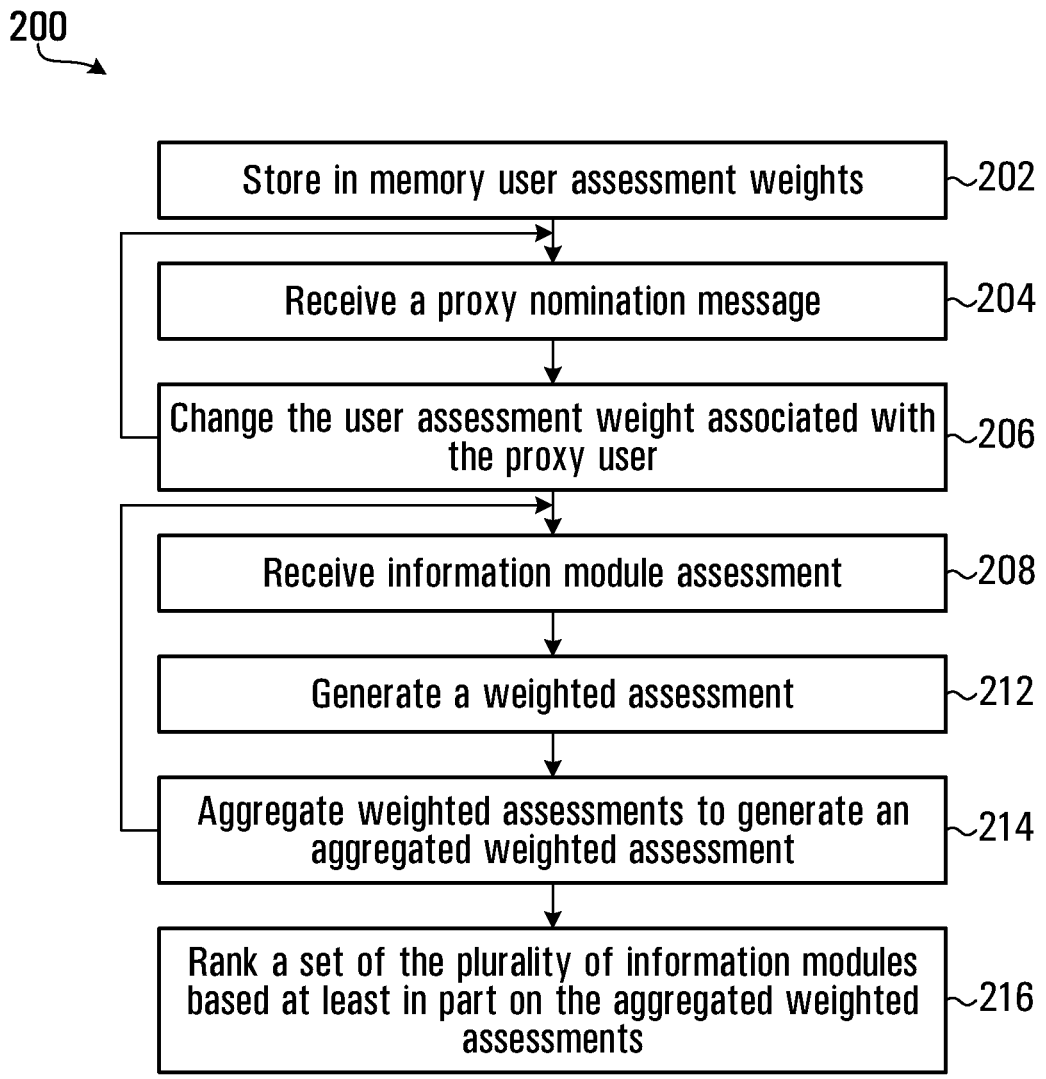
FIG. 5 is a flowchart depicting blocks of code for directing the server of the system of FIG. 1 to process user provided information in accordance with an embodiment of the invention.

Referring to FIG. 5, a flowchart depicting blocks of code for directing the server 12 shown in FIG. 4 to process user provided information from a plurality of users in a digital network for ranking one or more information modules in accordance with one embodiment is shown generally at 200. The flowchart 200 may be encoded in the block of codes 120 shown in FIG. 4 for example.

Referring to FIG. 5, the flowchart 200 begins with block 202 which directs the server processor 100 shown in FIG. 4 to store in memory respective user assessment weights, each of the user assessment weights associated with a user of the plurality of users and representing a weight to be applied to information module assessments received from that user.

In some embodiments block 202 may direct the server processor 100 shown in FIG. 4 to store in the location 130 of the storage memory 104 respective user records, each of the user records associated with one of the users. In some embodiments, for example, block 202 may direct the server processor 100 to store a first user record 250, as shown in FIG. 6, in association with a first user.

Referring to FIG. 6, the first user record 250 includes a user identifier field 252 for storing an identifier for identifying the first user record 250, and a user assessment weight field 254 for storing a representation of a user assessment weight associated with the user.

In some embodiments, the first user record 250 may include other fields such as, for example, name and surname fields 256 and 258 for storing first and last names of the first user, a username field 260 for storing a username associated with the user and a password field 262 for storing a value for verifying a password provided by the user. In some embodiments, the password field 262 may store a salted and hashed value for verifying the password. In the embodiment shown, the first user record 250 also includes a proxy count field 264, a nominator count field 266, an experience value field 268, and an engagement value field 270 for storing various values which may act as user assessment weight factors and may be used to determine the user assessment weight for the first user, and which may be changed or updated as described in further detail herein.

Block 202 may direct the server processor 100 to store in the location 130 of the storage memory 104 a respective user record for each user of the plurality of users of the system 10. In some embodiments, code included in the block 202 may be executed to generate and store user records when users are initially registered in the system. For example, in some embodiments, each user of the system may initiate execution of code included in the block 202 when the user registers in the system, for example, by using one of the user devices 13, and may provide the information to be stored in the name, surname and password fields of their user record. In some embodiments, the server 12 may be configured to generate a unique identifier for the user identifier field 252 and to generate a unique username for the username field 260 based on the name and surname provided by the user.

In some embodiments, the proxy count field 264, nominator count field 266, and engagement value field 270 may be initialized to a value of 0 upon generation of the user record 250, but may be updated by the server 12. The experience value field 268 may be set to a default value of 0. In various embodiments, an administrator may update and/or provide initial values for the experience value field 268 such as by using one of the user devices 13.

Block 202 may direct the server processor 100 to determine and set the value stored in the user assessment weight field 254 as a function of the data stored in one or more of the fields 264-270, for example, using a formula as described in further detail below. In some embodiments, block 202 may direct the server processor 100 to set the value stored in the user assessment weight field 254 to a default value of 1.0, for example.

After execution of block 202, a plurality of user records, each generally similar in format to the first user record 250 shown in FIG. 6 and corresponding to a respective user, may be stored in the location 130 of the storage memory 104.

Referring to FIG. 5, block 204 then directs the server processor 100 shown in FIG. 4 to receive a proxy nomination message including a proxy user identifier identifying a proxy user that a nominating user of the plurality of users wishes to act as a proxy in providing information. In some embodiments, a user using one registered in the system. For example, in some embodiments, each user of the system may initiate execution of code included in the block 202 when the user registers in the system, for example, by using one of the user devices 13, and may provide the information to be stored in the name, surname and password fields of their user record. In some embodiments, the server 12 may be configured to generate a unique identifier for the user identifier field 252 and to generate a unique username for the username field 260 based on the name and surname provided by the user.

In some embodiments, the proxy count field 264, nominator count field 266, and engagement value field 270 may be initialized to a value of 0 upon generation of the user record 250, but may be updated by the server 12. The experience value field 268 may be set to a default value of 0. In various embodiments, an administrator may update and/or provide initial values for the experience value field 268 such as by using one of the user devices 13.

Block 202 may direct the server processor 100 to determine and set the value stored in the user assessment weight field 254 as a function of the data stored in one or more of the fields 264-270, for example, using a formula as described in further detail below. In some embodiments, block 202 may direct the server processor 100 to set the value stored in the user assessment weight field 254 to a default value of 1.0, for example.

After execution of block 202, a plurality of user records, each generally similar in format to the first user record 250 shown in FIG. 6 and corresponding to a respective user, may be stored in the location 130 of the storage memory 104.

Referring to FIG. 5, block 204 then directs the server processor 100 shown in FIG. 4 to receive a proxy nomination message including a proxy user identifier identifying a proxy user that a nominating user of the plurality of users wishes to act as a proxy in providing information. In some embodiments, a user using one of the user devices 13 may use a data processing application with web browser functionality to communicate and interact with the server 12 and provide the proxy nomination message.

Figure 7:
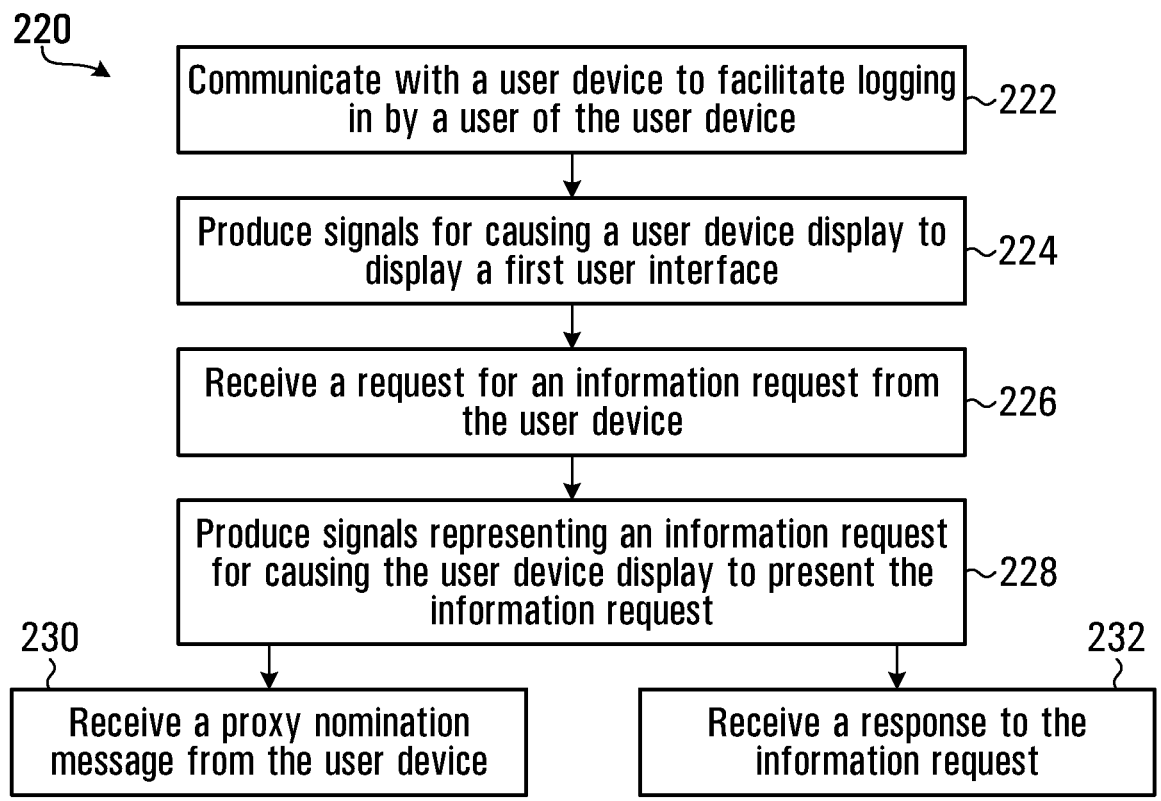
FIG. 7 is a flowchart depicting blocks of code that may be included in the blocks of code shown in FIG. 5 in accordance with an embodiment of the invention.

Referring to FIG. 7, there is shown at 220 a flowchart depicting blocks of codes that may be included in the block 204 of the flowchart shown in FIG. 5 in accordance with one embodiment. Execution of the blocks of codes shown in the flowchart 220 may direct the server processor 100 to facilitate reception of and receive a proxy nomination message from a user device based on input received from a user of the user device.

Figure 8:
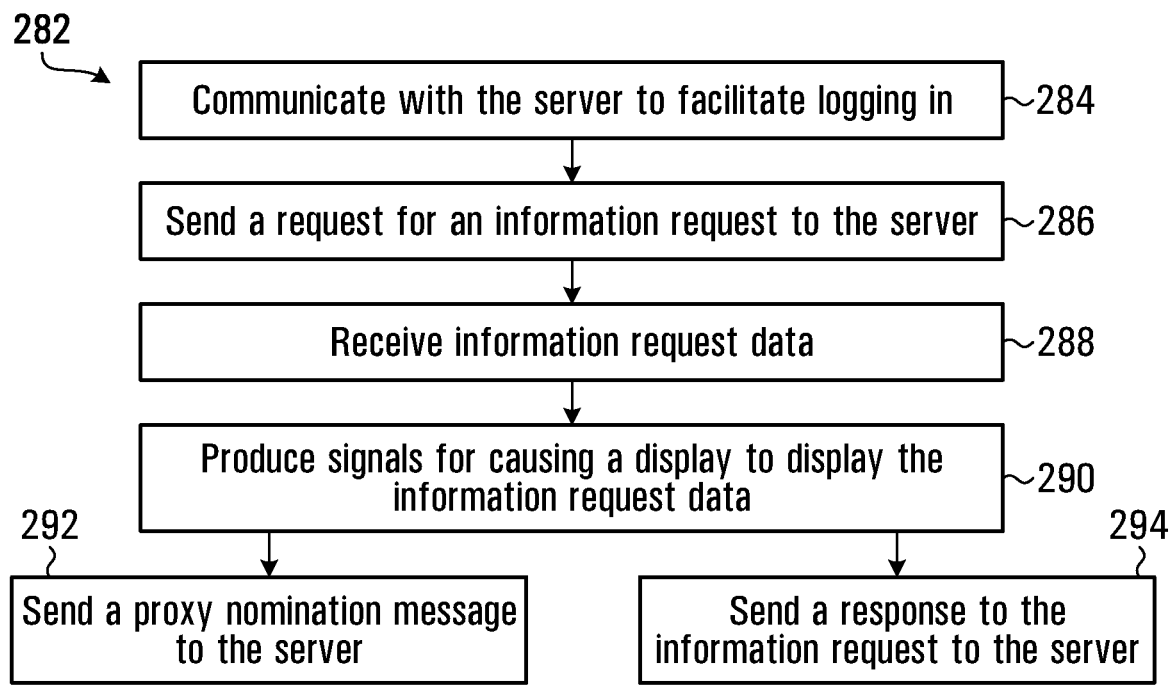
FIG. 8 is a flowchart depicting blocks of code for directing a user device of the system of FIG. 1 to facilitate processing of user provided information in accordance with an embodiment of the invention.

Referring to FIG. 8, there is shown a flowchart 282 depicting blocks of codes that may be included in the block of codes 70 of the first user device 14 shown in FIG. 2 which may be executed by the first user device processor 40 concurrently or in cooperation with the blocks shown in the flowchart 220 of FIG. 7 being executed by the server processor 100. While the flowchart 282 is described herein as being executed by the first user device 14, in various embodiments, the flowchart 282 or generally similar blocks of codes may be stored in and/or executed by other user devices included in the system 10 in cooperation with the flowchart 220.

In various embodiments, the first user may be using the first user device 14 and may wish to view and respond to information requests or questions provided by the system 10 and the first user may use the data processing application of the first user device 14 to interact with the information processing application of the server 12 to do so. For example, in some embodiments, the first user may be an employee of a group or organization and may wish to respond to the information requests for various reasons, such as, for example, if it is the organization's policy that the first user respond to or nominate a proxy for responding to a minimum number of information requests every day, week, or month.

In this specification, when it is described that a device or part of a device, such as the first user device 14, the first user device processor 40, the server 12, or the server processor 100, for example, communicates with another device via the network 20, such as by sending or receiving information, it may be understood that the communication involves causing signals to be produced and/or received by an I/O interface of the device at a respective network interface of the I/O interface to facilitate the communication of the information across the network 20.

Figure 9:
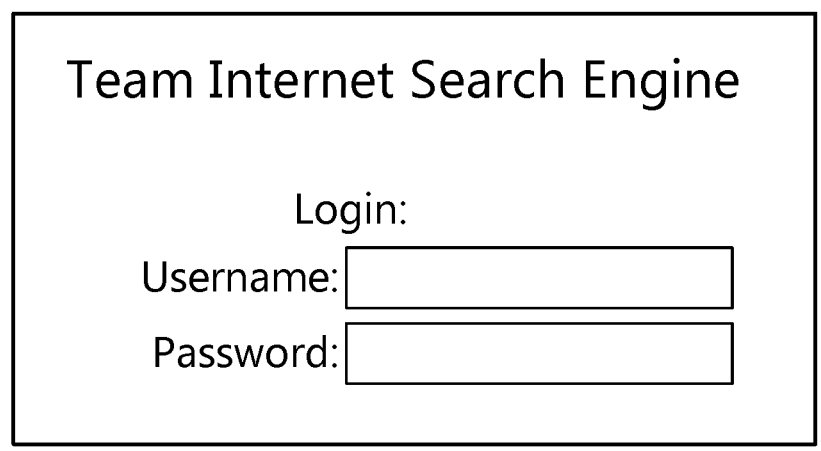
FIG. 9 is a representation of an exemplary login window that may be displayed by a display of a user device of the system shown in FIG. 1.

The flowchart 220 begins with block 222 which directs the server processor 100 to communicate with a user device to facilitate logging in by a user of the user device. For example, block 222 may direct the server processor 100 to communicate with the first user device 14 to facilitate logging in by the first user of the first user device 14. Block 222 may direct the server processor 100 to produce signals for causing the display 60 of the first user device 14 to display a login window as shown at 278 in FIG. 9. For example, block 222 may direct the server processor 100 to produce signals for causing the I/O interface 106 of the server 12 shown in FIG. 4 to communicate with the first user device 14 by transmitting signals via the interface 112 and the network 20 to cause the first user device 14 to receive signals via the interface 64 of the I/O interface 52 to cause the first user device processor 40 to communicate with the display 60 through the interface 54 of the I/O interface 52 to cause the display 60 to display the window 278 shown in FIG. 9.

Referring to FIG. 8, block 284 of the flowchart 282 may be executed concurrently or in cooperation with block 222 of the flowchart 220 shown in FIG. 7 and directs the first user device processor 40 of the first user device 14 shown in FIG. 2 to communicate with the server 12 to facilitate logging in by the first user. Block 284 may direct the first user device processor 40 to receive data from the server 12 and to produce signals for causing the display 60 to display the login window 278 shown in FIG. 9. Block 284 may also direct the first user device processor 40 to receive user login information including a username and password from the user via the user input devices 62 and to send the user login information to the server 12 for verification.

Block 222 may direct the server processor to confirm the login information with the information stored in the location 130 of the storage memory 104 and, once confirmed, to send first user information to the first user device 14. In some embodiments, block 222 may direct the server processor 100 to send to the first user device 14 a representation of at least a portion of the first user record 250 shown in FIG. 6. For example, block 222 may direct the server processor 100 to send to the first user device a representation of the contents of the user identifier field 252. Block 222 may also send to the first user device a representation of other fields of the first user record 250 such as, for example, the name and surname fields 256 and 258. Upon receipt of the user information, block 284 may direct the first user device processor 40 to store the received user information as a current user record in the location 80 of the storage memory 44.

Figure 10:
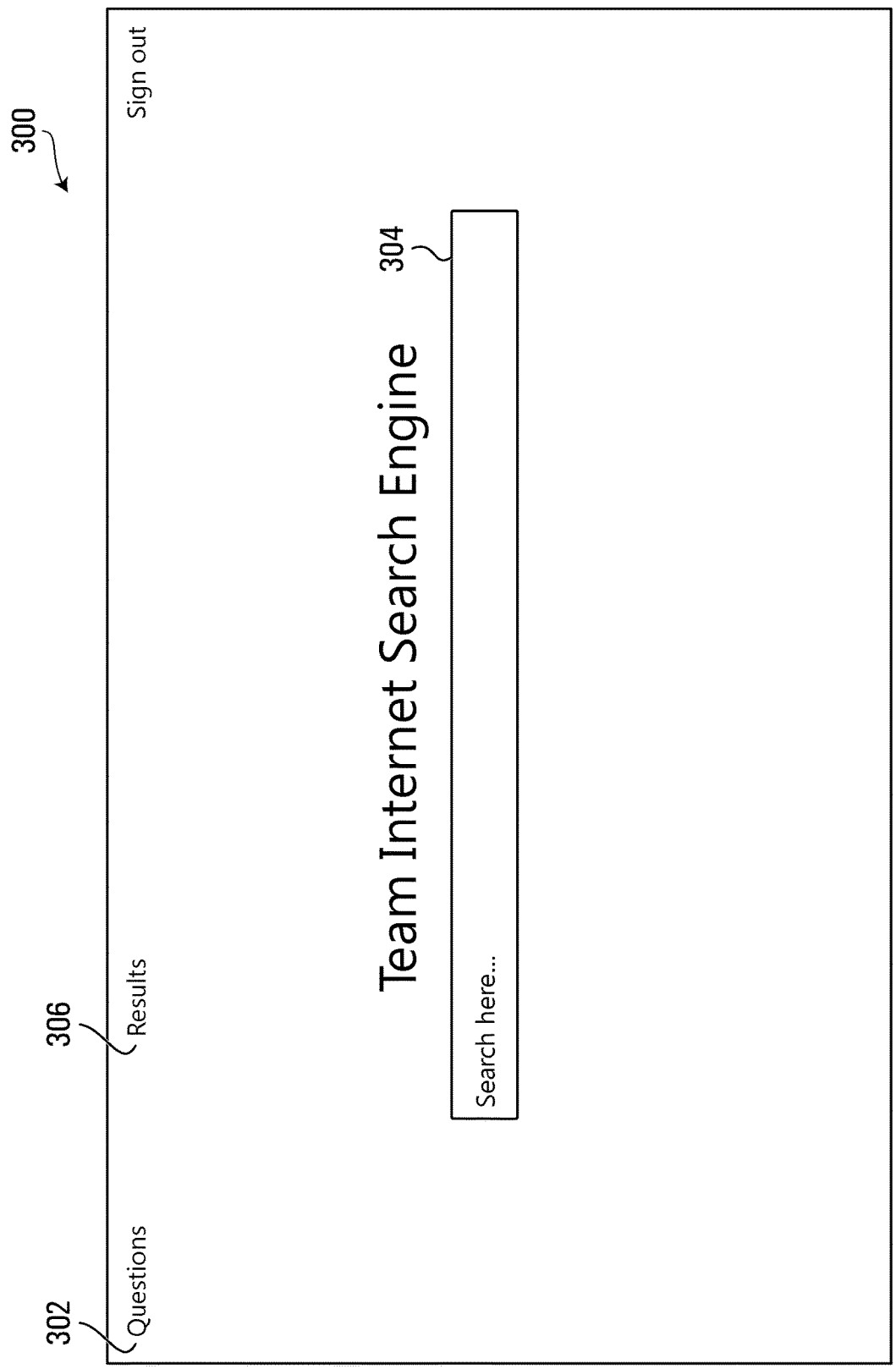
FIG. 10 is a representation of an exemplary webpage that may be displayed by a display of a user device of the system shown in FIG. 1.

Referring to FIG. 7, block 224 then directs the server processor 100 shown in FIG. 4 to produce signals for causing a user device display to display a first user interface. For example, block 224 may direct the server processor 100 to produce signals for causing the display 60 shown in FIG. 2 to display a webpage 300, as shown in FIG. 10, which may act as a graphical user interface. In some embodiments, the webpage 300 may act as a start page from which a user can access various functionality of the system 10.

The first user may use one or more of the user input devices 62 of the first user device 14 shown in FIG. 2 to select a request question link 302 included in the webpage 300. The selection of the request question link 302 may initiate block 286 of the flowchart 282 shown in FIG. 8 which directs the first user device processor 40 to send a request for an information request or question to the server 12. In some embodiments, block 284 may direct the first user device processor 40 to send a webpage request to the server 12, requesting a webpage associated with information requests.

Referring to FIG. 7, block 226 then directs the server processor 100 to receive a request for an information request from the user device. For example, in some embodiments, block 226 may direct the server processor 100 to receive the request for the information request which was sent at block 286 of the flowchart 282 shown in FIG. 8.

Block 228 then directs the server processor 100 to produce signals representing an information request for causing a user device display to display or present the information request to a user. In various embodiments, block 228 may direct the server processor 100 to retrieve from the location 132 of memory, one or more information request records representing information requests which may have been previously provided and stored in the storage memory 104 and to send a representation of the one or more information request records to the first user device 14 for display by the display 60.

For example, in some embodiments, users of the system 10 may have previously used the user devices 13 shown in FIG. 1 to submit to the server 12 information requests including questions, possible responses, and an expiry date by which the user wishes to review the responses, for example, looking for feedback from other users. Upon receiving an information request, the server processor 100 may have been directed by code included in the block of codes 120 to cause an information record representing the information request to be generated and stored in the location 132 of the storage memory 104. Accordingly, in various embodiments, at the time block 228 is executed, one or more information request records representing one or more information requests may be stored in the location 132 of the storage memory 104.

An exemplary first information request record representing a first question that may already be stored in the location 132 of the storage memory 104 at the time block 228 is executed is shown at 350 in FIG. 11. Referring to FIG. 11, the first information request record 350 includes an information request identifier field 352 for storing an information request record identifier, a subject field 354 for storing a text representation of a subject of the first question, and a description field 356 for storing a text representation of a description of the first question. In the embodiment shown, the first information request record 350 also includes a proxy count field 358 for storing a count of the number of proxy nominations that have been received with respect to the record. The first information request record 350 also includes response fields 360, 362, 364, and 366 for storing possible responses to the first question. The first information request record 350 also includes an expiry date field 368 for storing a representation of a date and time after which the responses to the information request are to be processed, as described in further detail below having regard to FIG. 26, for example. In the embodiment shown, the value stored in the expiry date field 368 has a format of YYYYMMD-DHHMM. In various embodiments other representations of date and time may be used.

In various embodiments, the contents of the subject field 354, the description field 356, the response fields 360-366, and the expiry date field 368 of the first information request record 350 may have been previously provided upon submission of the first question to the system 10, for example, by a user of the system 10 using a user device, whereupon the server processor 100 may have been directed to cause the first information request record 350 to be stored in the location 132 of the storage memory 104. As discussed above, in various embodiments, a plurality of information request records generally similar in format to the first information request record 350 may be stored in the location 132 of the storage memory 104.

While the first information request record 350 shown in FIG. 11 includes a plurality of response fields with unique responses, in various embodiments, one or more information request records generally similar in format to the first information request record 350 may represent questions having various response fields.

For example, in some embodiments, the response fields may store possible responses of "Yes" or "No" only.

Figure 12:
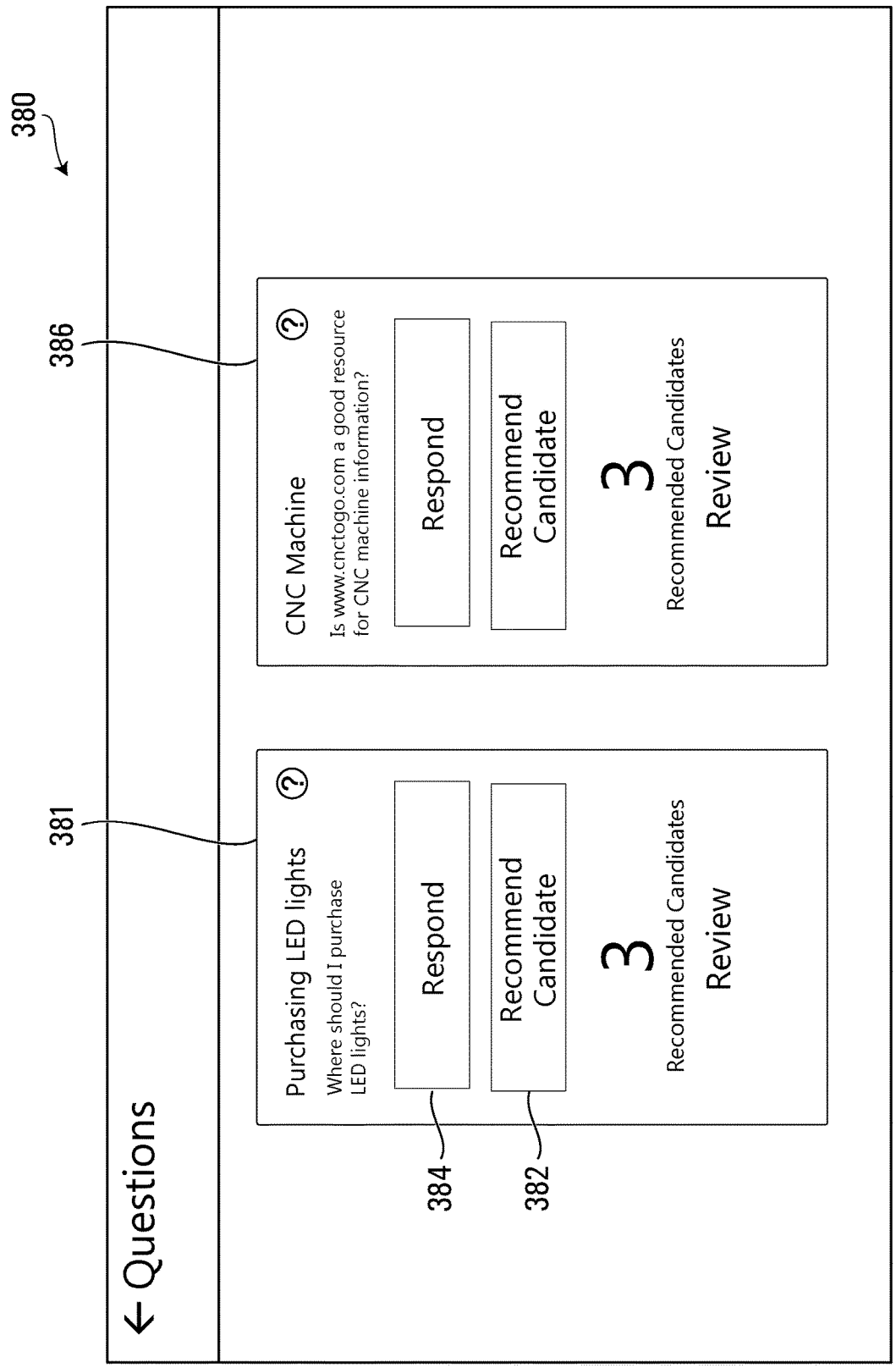
FIG. 12 is a representation of an exemplary webpage that may be displayed by a display of a user device of the system shown in FIG. 1.

Referring to FIG. 7, block 228 may direct the server processor 100 shown in FIG. 4 to retrieve the first information request record 350 representing the first question from the location 132 of the storage memory 104, and to send a representation of data from one or more fields of the first information request record 350 to the first user device 14 to cause the display 60 of the first user device 14 to display a webpage 380 as shown in FIG. 12, including a representation 381 of the first question. In displaying the webpage 380, the display 60 may act as an information request display. In some embodiments, block 228 may direct the server processor 100 to transmit an HTML file including a representation of the first information request data stored in the fields 352-358 of the first information request record 350 to the first user device 14.

In some embodiments block 228 may direct the server processor 100 to retrieve and send a representation of values from additional information request records, for which a response is desired from the first user. For example, block 228 may direct the server processor 100 to retrieve and send a representation of values from a second information request record to the first user device 14 to cause the display 60 of the first user device 14 to display the webpage 380 including a representation 386 of a second information request.

Referring back to FIG. 8, block 288 directs the first user device processor 40 to receive information request data. Block 288 may direct the first user device processor 40 to receive the first information request data sent by the server 12 at block 228 of the flowchart 220 shown in FIG. 7, for example. Block 288 may direct the first user device processor 40 to store the first information request data as an information request record in the location 82 of the storage memory 44.

Block 290 then directs the first user device processor 40 to produce signals for causing the display 60 to display the information request data. Block 290 may direct the first user device processor 40 to produce signals for causing the display 60 to display the webpage shown at 380 in FIG. 12 including the representation 381 of the first question.

Referring to FIG. 12, the representation 381 of the first question in the webpage 380 includes a proxy nomination link 382 and a respond link 384 for selection by the user and thus the first user is given a choice of responding to the information request or nominating another user to act as a proxy for the first user in responding to the question. If the first user wishes to nominate a user to act as a proxy, the first user may use the user input devices 62 to select the proxy nomination link 382 to initiate execution of block 292 and block 230 of the flowchart 220 shown in FIG. 7. If the first user wishes to respond to the information request, the user may use the user input devices 62 to select the respond link 384 to initiate execution of block 294 and block 232 of the flowchart 220.

In various embodiments, the first user may use the user input devices 62 to select the proxy nomination link 382 to initiate execution of block 292 by the first user device processor and block 292 directs the first user device processor 40 to send a proxy nomination message to the server 12. Execution of block 292 may trigger execution of block 230 of the flowchart 220 shown in FIG. 7 by the server processor 100 which may be executed concurrently or in cooperation with block 292 and which directs the server processor 100 to receive a proxy nomination message from the user device.

In various embodiments, execution of blocks 292 and 230 may cause the display 60 to provide one or more user interfaces to the first user to facilitate the first user selecting a proxy user and causing the first user device 14 to send the proxy nomination message to the server 12.

Referring to FIG. 8, for example, in various embodiments, block 292 may direct the first user device processor 40 shown in FIG. 2 to request user information from the server 12 and block 230 may direct the server processor 100 shown in FIG. 4 to retrieve user information from the location 130 of the storage memory 104 and send a representation of user information to the first user device processor 40. Block 230 may direct the server processor 100 to retrieve the user records stored in the location 130 and to send representations the user records to the first user device 14 to cause the display 60 to display a window as shown at 400 in FIG. 13, including a list of users 402 from which the first user can select a user which the first user wishes to act as a proxy for responding to the first question. For example, in some embodiments, block 230 may direct the server processor 100 to retrieve from the user records user information including user identifiers, names, and surnames and to send the user information to the first user device 14. In some embodiments, block 230 may direct the server processor 100 to facilitate adding to the list of users 402 a user which is not included in the list 402. Block 292 may direct the first user device processor 40 to receive the user information and to store the user information in the location 84 of the storage memory 44.

Figures 13, 14:
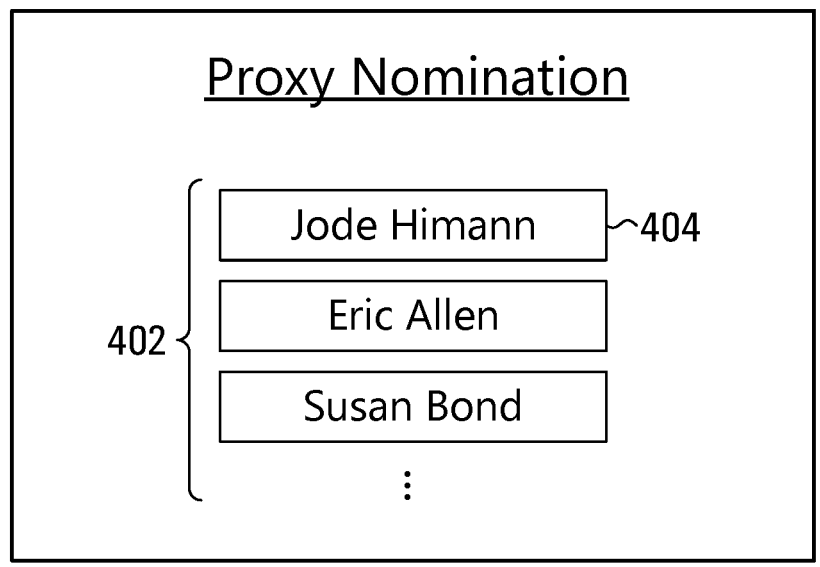
FIG. 13 is a representation of an exemplary window that may be displayed by a display of a user device of the system shown in FIG. 1.
FIG. 14 is a representation of an exemplary proxy nomination record that may be used in the system shown in FIG. 1.

Referring to FIG. 2, the first user may use the user input devices 62 of the first user device 14 to select a first user 404 from the list 402 shown in FIG. 13 and to cause the block 290 of the flowchart 282 shown in FIG. 8 to direct the first user device processor 40 to generate a proxy nomination record, for example, as shown at 420 in FIG. 14 based on the selection. The proxy nomination record 420 includes an information request identifier field 422 for storing an information request identifier identifying the information request for which the proxy nomination is being made, a proxy user identifier field 424 for storing a user identifier identifying the proxy user selected by the nominating user, a nominating user identifier field 426 for storing a user identifier identifying the nominating user, and a nomination time field 428 for storing a representation of the time at which the proxy nomination associated with the proxy nomination record 420 took place.

Referring to FIG. 8, block 292 may direct the first user device processor 40 shown in FIG. 2 to retrieve the identifier for the information request identifier field 422 from the location 82 of the storage memory 44, to retrieve the identifier for the nominating user identifier field 426 from the current user record stored in the location 80 of the storage memory 44, and to retrieve the identifier for the proxy user identifier field 424 from the location 84 of the storage memory 44. Block 292 may direct the first user device processor 40 to set the nomination time field 428 to a representation of the current time. In some embodiments, block 292 may direct the first user device processor 40 to store a representation of the proxy nomination record 420 in the location 86 of the storage memory 44.

Block 292 may then direct the first user device processor 40 to send a representation of the proxy nomination record 420 to the server 12. In some embodiments, the representation of the proxy nomination record 420 may act as a proxy nomination message.

Block 230 directs the server processor 100 to receive the representation of the proxy nomination record 420 from the first user device 14. In some embodiments, block 230 may direct the server processor 100 to store the proxy nomination record 420 in the location 134 of the storage memory 104. Block 230 may direct the server processor 100 to update the first information request record 350 shown in FIG. 11 based on the received proxy nomination record 420. For example, block 230 may direct the server processor 100 to increment the proxy count field 358 of the first information request record 350 stored in the location 134 from 3 to 4.

Referring back to FIG. 5, after block 204 has been executed block 206 directs the server processor 100 to change the user assessment weight associated with the proxy user based on the proxy nomination message received at block 204. In some embodiments, execution of block 206 may be initiated in response to block 204 being executed and a proxy nomination message being received at the server 12.

Block 206 may direct the server processor 100 to update a user record associated with the proxy user that is stored in the location 130 of the storage memory 44. For example, in some embodiments, where the proxy nomination record 420 as shown in FIG. 14 was received at block 204, block 206 may direct the server processor 100 to update a user record associated with the identifier stored in the proxy user identifier field 424 of the proxy nomination record 420.

Referring to FIG. 15 a flowchart 450 is shown depicting blocks of code which may be included in the block 206 of the flowchart 200 shown in FIG. 5 in accordance with one embodiment. The flowchart 450 begins with block 452 which directs the server processor 100 to update a proxy count for a proxy user associated with the proxy nomination message received at block 204.

For example, in some embodiments where a representation of the proxy nomination record 420 as shown in FIG. 14 was received at block 204, block 452 may direct the server processor 100 to read the user information stored in the location 130 to find a second user record as shown at 480 in FIG. 17 having an identifier stored in the user identifier field 482 that corresponds to the identifier stored in the proxy user identifier field 424 of the proxy nomination record 420. The second user record 480 shown in FIG. 17 includes a proxy count field 484 which is set to 0, indicating that the second user has not before been nominated as a proxy user. Block 452 may direct the server processor 100 to increment a count stored in the proxy count field 484 of the second user record 480, to cause the second user record 480 to include an updated value in the proxy count field 484 as shown in FIG. 18.

Block 454 then directs the server processor 100 to update a weight for the proxy user. In some embodiments, block 454 may direct the server processor 100 to change a value stored in a user assessment weight field 486 of the second user record 480 based at least in part on the updated value stored in the proxy count field 484 shown in FIG. 18. For example, in some embodiments, block 454 may direct the server processor 100 to determine a value for the user assessment weight field 486 using the following formula:

$$W = A*P + B*N + C*Ex + D*En + 1.0$$

where W is the user assessment weight, A, B, C, and D are each constants that may be set by an administrator, P is the updated value taken from the proxy count field 484, N is a value taken from a nominator count field 488, Ex is a value taken from an experience value field 490, and En is a value taken from an engagement value field 492 of the second user record 480. The final term of 1.0 may act as a default value for the user assessment weight and may in various embodiments be set by an administrator.

In some embodiments, A may be set to 0.5 and so block 454 may direct the server processor 100 to update the value of the user assessment weight field 486 to be equal to 0.5*1+0+0+0+0+1.0=1.5 as shown in the second user record 480 shown in FIG. 18.

Notably in various embodiments, any or all of the terms, B*N, C*Ex, D*En or E*M may be omitted from the formula for W depending on the particular factors that a group or organization wishes to consider in determining user assessment weights. For example, in some embodiments, block 454 may direct the server processor 100 to determine a value for the user assessment weight field 486 using W=A*P+1.0.

Generally, in various embodiments, the system 10 may facilitate flexibility by facilitating changing the terms and/or constants for different group environments and/or sizes. For example, some groups may value different elements more than others. For example, a large company might value brand more than culture in its organizational design.

In some embodiments, in addition to or instead of executing the block 206 shown in FIG. 5, the server processor 100 may execute blocks of code depicted by a flowchart 455 shown in FIG. 16 for directing the server processor 100 to change the user assessment weight associated with the nominating user. The blocks of code depicted in FIG. 16 may be included in the flowchart 200 shown in FIG. 5, for example.

The flowchart 455 starts with block 456 which directs the server processor 100 to update a nominator count for a nominating user associated with the proxy nomination message received at block 204.

For example, in some embodiments where the proxy nomination record 420 as shown in FIG. 14 was received at block 204, block 456 may direct the server processor 100 to read the user information stored in the location 130 to find the first user record as shown at 250 in FIG. 6 having an identifier stored in the user identifier field 252 that corresponds to the identifier stored in the nominating user identifier field 426 of the proxy nomination record 420. Block 456 may then direct the server to increment a count value stored in the nominator count field 266 of the first user record 250.

Block 458 then directs the server processor 100 to update a weight for the nominating user. In some embodiments, block 458 may direct the server processor 100 to change a value stored in the user assessment weight field 254 of the first user record 250 based at least in part on the value stored in the updated nominator count field 266. For example, in some embodiments, block 458 may direct the server processor to determine a value for the user assessment weight field 486 using the same formula used to determine the user assessment weight for a proxy user, as described above. For example, in some embodiments, block 458 may direct the server processor to determine a value for the user assessment weight field 486 using the following formula:

$$W = A*P + B*N + C*Ex + D*En + 1.0$$

where W is the user assessment weight, A, B, C, and D are each constants that may be set by an administrator, P is the updated value taken from the proxy count field 264, N is a value taken from the nominator count field 266, Ex is a value taken from the experience value field 268, and En is a value taken from the engagement value field 270.

In some embodiments, B may be set to 1.0 and so block 458 may direct the server processor 100 to update the value of the user assessment weight field 254 to be equal to 0+1.0*1+0+0+0+1.0=2.0.

After blocks 456 and 458 have been executed, the first user record 250 stored in the location 130 of the storage memory 104 may include values as shown in FIG. 19, for example.

Referring back to FIGS. 5, 15, and 16, blocks 204, 206, flowchart 450, and/or flowchart 455 may be substantially repeated for each of a plurality of proxy nomination messages which may be received by the server 12.

Referring back to FIG. 5, in various embodiments, the flowchart may continue at block 208, which directs the server processor 100 to receive an information module assessment for an information module. In some embodiments, a user using one of the user devices 13 may use the data processing application to communicate and interact with the server 12 to provide the information module assessment.

In various embodiments, information modules may include user-submitted content that is available to other users of the system 10, such as, posts which have been previously received by the sever 12 from users of the system 10. The information modules may be stored in the location 136 of the storage memory 104, for example. In some embodiments, the information modules may include links to webpages or search results from a search engine such as, for example, Google™.

In some embodiments, an information module can include almost any piece of information, from objective or subjective reality, that can be stored on a computer. For example, in some embodiments, a user may take a picture of a product, such as, for example, a mustard product at a grocery store and send it via a smartphone to the system 10 to be included in an information module record stored in the server 12. In some embodiments, for example, a user may cause a restaurant and description of the restaurant and experience to be included in an information module stored in the server 12. In some embodiments, each information module record may include information and identification of a submitting user, along with a time stamp, for example. In some embodiments, the information module records may include, for example, representations of a physical location, web address, occasion, and/or a relevant project. In some embodiments, the information module records may include links or web addresses for posts which have been made using a $3^{rd}$ party service. The links or web addresses may be associated with posts on, for example, Pinterest™ Google™ Stumbleupon™, Kijiji™, and/or Craigslist™.

Figure 20:
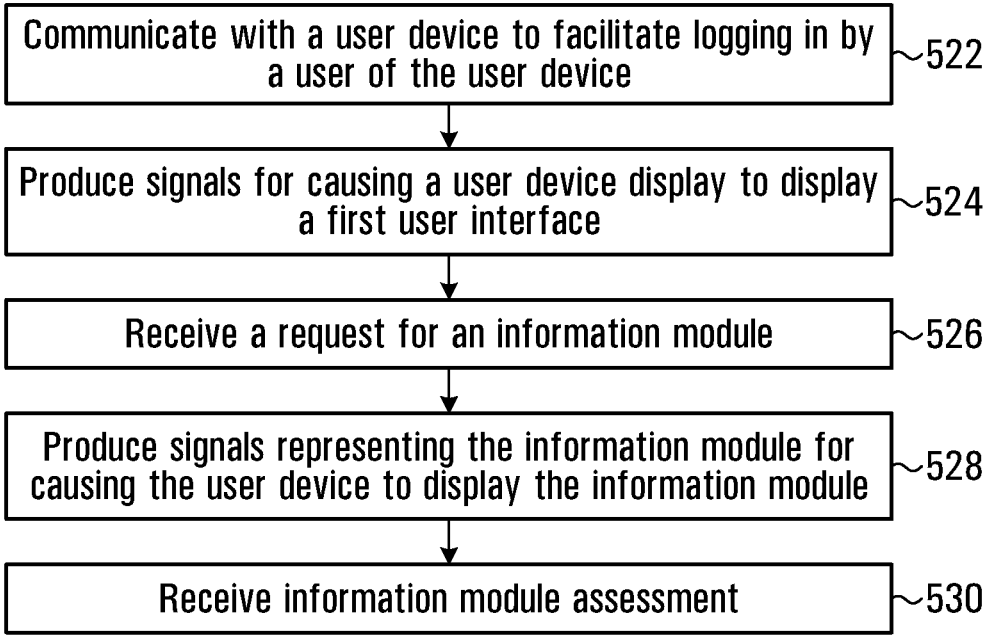
FIG. 20 is a flowchart depicting blocks of code which may be included in the blocks of code shown in FIG. 5 in accordance with an embodiment of the invention.

Referring to FIG. 20 there is shown a flowchart 520 depicting blocks of code which may be included in the block 208 shown in FIG. 5 in accordance with one embodiment. The blocks of code included in the flowchart 520 may be executed concurrently or in cooperation with blocks of code included in flowchart 540 shown in FIG. 21, which depicts blocks of codes that may be executed by a user device.

In one embodiment, the second user associated with the second user record 480 shown in FIG. 18 may use the second user device 16 to cause the second user device processor 160 to execute the flowchart 540 and the blocks of code depicted by the flowchart 540 may be included in data processing application codes of the program memory 162 of the second user device 16 shown in FIG. 3.

Referring to FIG. 20, the flowchart 520 begins with block 522 which directs the server processor 100 to communicate with a user device to facilitate logging in by a user of the user device. Block 522 may be executed concurrently or in cooperation with block 542 of the flowchart 540 shown in FIG. 21 and blocks 522 and 542 may be generally similar to blocks 222 and 284 shown in of the flowcharts 220 and 282 shown in FIGS. 7 and 8 and described above. In one embodiment, where the second user device 16 associated with the second user record 480 shown in FIG. 18 is using the second user device 16 to execute the codes included in the flowchart 540, after execution of the blocks 522 and 542 of the flowcharts 520 and 540, at least a user identifier of the second user record 480 shown in FIG. 18 may be stored in location 180 of the storage memory 164 of the second user device 16.

Referring to FIG. 20, block 524 directs the server processor to produce signals for causing a user device display to display a first user interface. Block 524 may be generally similar to block 224 of the flowchart 220 shown in FIG. 7 and described above and so, as a result of execution of block 524, the webpage 300 generally as shown in FIG. 10 may be displayed by the display 190 of the second user device 16.

Figure 21:
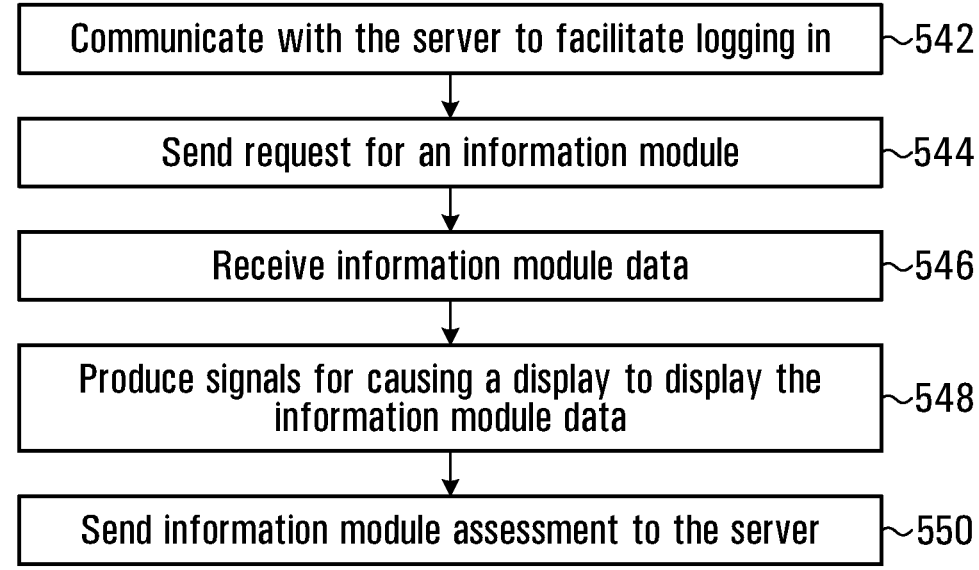
FIG. 21 is a flowchart depicting blocks of code for directing a user device of the system of FIG. 1 to facilitate processing of user provided information in accordance with an embodiment of the invention.

Referring to FIG. 10, when the user views the webpage 300, the user may enter a search query in a search field 304 to initiate execution of block 546 of the flowchart 540 shown in FIG. 21, which directs the second user device processor 160 to send a request for an information module. In some embodiments, block 546 may direct the second user device processor 160 to send the request for an information module in the form of a webpage request including a representation of the search query.

Referring to FIG. 20, block 526 then directs the server processor 100 to receive a request for an information module. For example, block 526 may direct the server to receive the request for the information module that was sent by the second user device 16 at block 546 of the flowchart 540. In some embodiments, block 526 directs the server processor 100 to store in the storage memory 164 a representation of the search query included in the request for the information module.

Block 528 then directs the server processor 100 to produce signals representing one or more information modules for causing the user device to display the information modules to a user. Block 528 may direct the server processor 100 to cause a search to be performed using the search query included in the request for the information module.

In some embodiments, block 528 may direct the server processor 100 to cause information modules represented by information module records stored in the location 136 of the storage memory 104 to be searched and to identify one or more candidate information modules based on the search. Block 528 may then direct the server processor 100 to produce signals representing the one or more candidate information modules to cause a user device to display the one or more candidate information modules. In some embodiments, block 528 may direct the server processor 100 to rank the information modules, for example, as described in further detail below.

In various embodiments, block 528 may direct the server processor 100 to perform a search of information module records stored in the location 136 of the storage memory 104 using the search query to identify one or more information module records including an exemplary first information module record 560 as shown in FIG. 22. The first information module record 560 includes an information module identifier field 562 for storing a unique identifier associated with the first information module, a title field 564 for storing a title of the information module, a description field 566 for storing a description associated with the information module, and an aggregated weighted assessment field 570 for storing a value representing an aggregated weighted assessment of the information module, based on user assessments previously provided by users. The first information module record 560 also includes a plurality of user assessment identifier fields 568 for storing user identifiers associated with users who have provided positive feedback or "likes" for the information module.

In various embodiments, the first information module record 560 may further include one or more tag fields for storing tags associated with the information module, one or more link fields for storing links associated with the information module, and/or one or more comment fields for storing comments associated with the information module. The contents for the tag, link, and/or comment fields may be provided and/or updated by users of the user devices 13.

Figure 23:
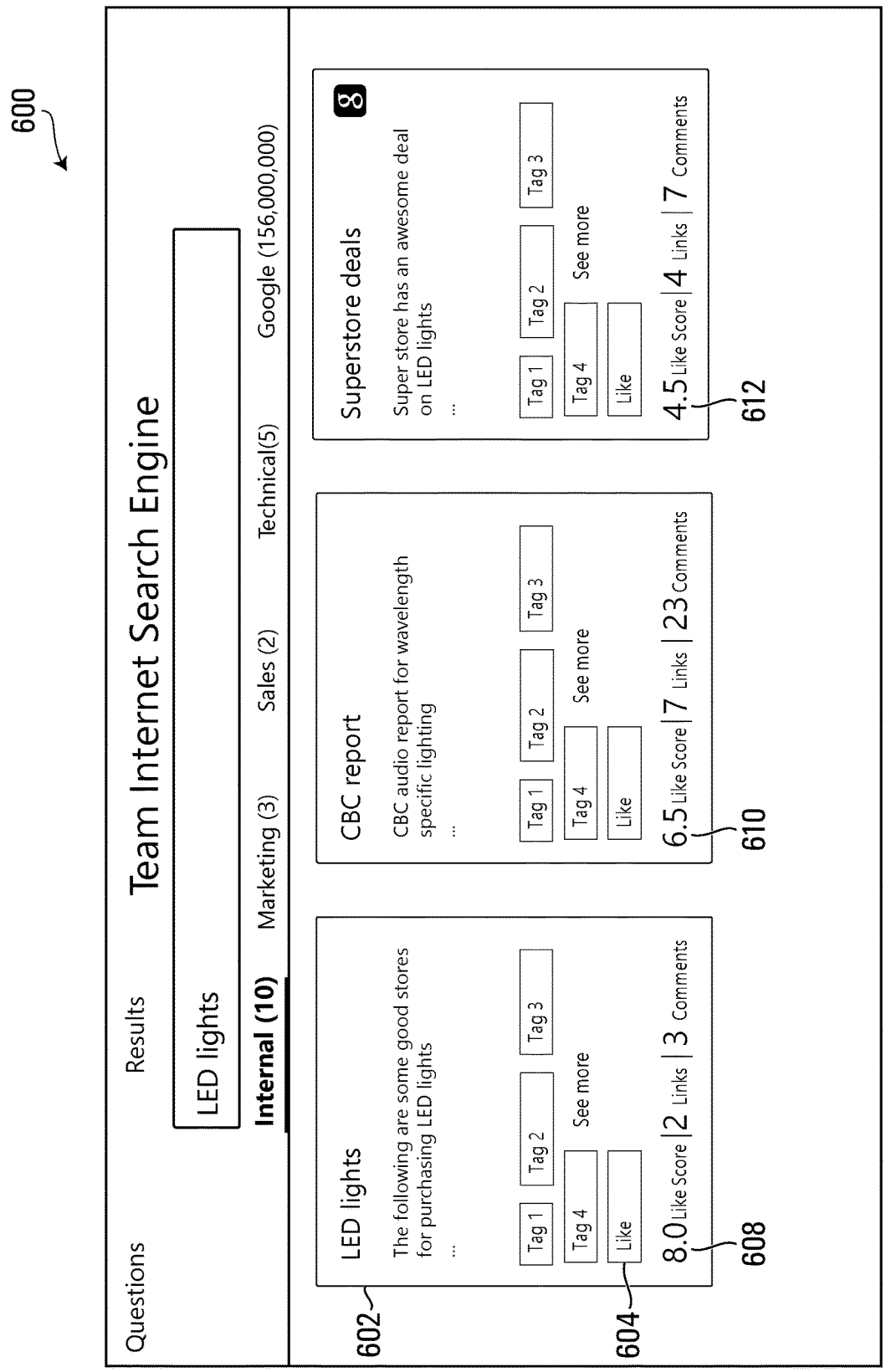
FIG. 23 is a representation of an exemplary webpage that may be displayed by a display of a user device of the system shown in FIG. 1.

Block 528 may direct the server processor 100 to retrieve the one or more information module records including the first information module record 560 from the location 136 of the storage memory 104 and to send a representation of a webpage to the second user device 16 to cause the display 190 of the second user device 16 to display the webpage 600 as shown in FIG. 23, including a representation 602 of the first information module record. In some embodiments, block 528 may direct the server processor 100 to transmit at least a portion of the first information module record 560 to the second user device 16 via the interface 64 of the I/O interface 52 and the network 20 to cause the display 190 to display the representation 602 of the information module. For example, block 528 may direct the server processor 100 to transmit a representation of the information module data stored in the fields 562, 564, 566, and 570 of the first information module record 560 to the second user device 16 within an HTML file.

Referring back to FIG. 21, block 546 directs the second user device processor 160 to receive information module data. Block 546 may direct the second user device processor 160 to receive the information module data sent by the server 12 at block 528 of the flowchart 520 shown in FIG. 20. Block 546 may direct the second user device processor 160 to store the information module data in the location 188 of the storage memory 164.

Block 548 then directs the second user device processor 160 to produce signals for causing the display 190 to display the information module data. Block 548 may direct the second user device processor 160 to produce signals for causing the display 190 to display the webpage shown at 600 in FIG. 23 including the representation 602 of the information module.

Upon viewing the webpage 600 shown in FIG. 23, the second user may use user input devices 192 of the second user device 16 shown in FIG. 3 to select a positive feedback user assessment link 604 to initiate execution of block 550 by the second user device processor 160 which directs the second user device processor to send information module assessment data to the server 12.

Referring to FIG. 21, in various embodiments, block 550 may direct the second user device processor 160 shown in FIG. 3 to send an information module assessment to the server 12. In various embodiments, block 550 may direct the second user device processor 160 to generate an information module assessment record, such as information module assessment record 620 shown in FIG. 24 and to send a representation of the information module assessment record 620 to the server 12. In some embodiments, block 550 may direct the second user device processor 160 to store the information module assessment record 620 in the location 188 of the storage memory 164.

The information module assessment record 620 includes an information module identifier field 622 for storing an identifier identifying the information module which is being assessed and a user assessment identifier field 624 for storing a user identifier identifying the user which is providing the assessment, which in the embodiment shown is the second user. In various embodiments, block 550 may direct the second user device processor 160 to retrieve the identifier to be included in the information module identifier field 622 of the information module assessment record 620 from the information module data stored in the location 188 of the storage memory 164 and to retrieve the identifier for the user assessment identifier field 624 from the current user record associated with the user logged in at the second user device 16 and stored in the location 180 of the storage memory 164.

Referring back to FIG. 20, block 530 directs the server processor 100 to receive the information module assessment. In various embodiments, block 530 may direct the server processor 100 to receive a representation of the information module assessment record 620 and to update information module information based on the information module assessment record 620. For example, block 530 may direct the server processor 100 to update the information module record associated with the information module identifier included in the information module identifier field 562.

Where a representation of the first information module assessment record 620 shown in FIG. 24 is received at block 530, block 530 may direct the server processor 100 to add the user identifier from the user assessment identifier field 624 to a new positive feedback user assessment field to be included in the user assessment identifier fields 568 of the first information module record 560 stored in the location 136 of the storage memory 104.

Referring back to FIG. 5, block 212 directs the server processor 100 shown in FIG. 4 to generate a weighted assessment based on the information module assessment received and a user assessment weight associated with a user associated with the information module assessment. For example, in various embodiments where the information module assessment record 620 was received at block 208, block 212 may direct the server processor 100 to determine a weighted assessment by looking up a user assessment weight for the user record associated with the user identifier stored in the user assessment identifier field 624 of the information module assessment record 620. Since the positive feedback assessment is Boolean, block 212 may direct the server processor to set the weighted assessment equal to the user assessment weight and block 212 may direct the server processor 100 to retrieve the second user record 480 shown in FIG. 18 and determine the weighted assessment to have a value of 1.5.

In some embodiments, the assessment may represent more information than simply a "like". For example, the assessment may represent a rating, such as between 0 and 5. In such embodiments, block 212 may direct the server processor 100 to determine the weighted assessment by scaling the assessment rating value by the user assessment weight such as, for example, by multiplying the assessment value by the user assessment weight.

Referring to FIG. 5, block 214 then directs the server processor 100 to aggregate weighted assessments to generate an aggregated weighted assessment. In various embodiments, block 214 may direct the server processor to add the weighted assessment determined at block 212 to the value stored in the aggregated weighted assessment field 570 of the first information module record 560 to determine a new aggregated weighted assessment. Block 214 may then direct the server processor 100 to store the new aggregated weighted assessment field in the aggregated weighted assessment field 570.

A representation of the first information module record 560 stored in the location 136 of the storage memory 104 after blocks 212 and 214 have been executed, in accordance with one embodiment, is shown in FIG. 25.

In various embodiments, blocks 208, 212, and 214 may be generally repeated such that a plurality of information module assessments are received and a plurality of information module records are updated. Each of the information module records may be updated a plurality of times in accordance with a plurality of received information module assessments. Accordingly, values stored in aggregated weighted assessment fields such as the aggregated weighted assessment field 570 may each represent an aggregation of weighted assessments, each of the weighted assessments based on one of the information module assessments received and a user assessment weight associated with a user associated with the information module assessment.

In some embodiments, blocks 212 and 214 of the flowchart 200 shown in FIG. 5 may be executed immediately after an information module assessment is received at block 208. In some embodiments, blocks 212 and 214 may be executed periodically, for a plurality of information module assessments received during a time period. For example, in some embodiments, blocks 212 and 214 may be executed to update the aggregated weighted assessments once a day, at night for example.

Referring back to FIG. 5, block 216 then directs the server processor 100 to rank or order a set of the information modules based at least in part on the aggregated weighted assessments. Block 216 may be initiated when a user wishes to browse or search the information modules. For example, a user may wish to use a user device to search the information modules stored in block 214 and so the user may use one of the user devices 13 to initiate a search, for example, by submitting a search query via the search field 304 of the webpage 300 shown in FIG. 10. In some embodiments, execution of block 216 may involve executing blocks generally similar to blocks 526 and 528 of the flowchart 520 shown in FIG. 20.

Block 216 may direct the server processor 100 to read the information module records from the location 136 of the storage memory 104 to identify a set of one or more information module records which correspond to the search query submitted. Block 216 may direct the server processor 100 to rank the information module records included in the set based at least in part on the values stored in the aggregated weight assessment fields of the information module records. For example, in some embodiments block 216 may direct the server processor 100 to rank the information modules which matched the search query in descending order from an information module record having a highest aggregated weighted assessment to an information module record having a lowest aggregated weighted assessment.

In some embodiments, block 216 may direct the server processor 100 to use a "page rank" searching algorithm in conjunction with the aggregated weighted assessments to rank the information module records. In some embodiments, block 216 may direct the server processor 100 to determine a respective score for each of the information modules, each of the scores determined at least in part on a search score in view of the search query and at least in part on the aggregated weight assessment field of the information module record. For example, block 216 may direct the server processor 100 to determine a search score for each of the information module records based on the search query received and to derive an adjusted search score for each of the information based on an aggregation or sum of the search score and the aggregated weight assessment associated with the information module record. Block 216 may direct the server processor to rank the information module records based on the adjusted search scores.

In some embodiments, block 216 may direct the server processor 100 to produce signals for causing the set of information module records to be displayed by the user device being used by the searching user, in order based on their determined rank.

In some embodiments, block 216 may include code generally similar to the blocks 522-528 of the flowchart 520 shown in FIG. 20 and described above. The second user using the second user device 16 may submit a search query of "LED lights" and block 216 may direct the server processor 100 to produce signals for causing the display 190 to display a webpage generally similar to the webpage 600 having representations of the information modules shown in order of aggregated weighted assessments from greatest to smallest. In displaying the information modules in order, the display 190 may act as a ranking display. For example, representations of the aggregated weighted assessments may be included in the webpage 600 at 608, 610, and 612.

Scoring Responses to Inquiries

In some embodiments, it may be desirable to track user responses and proxy nominations associated with information requests or questions to rank or compare the responses and in some embodiments to determine a preferred response or set of corresponding responses.

Figure 26:
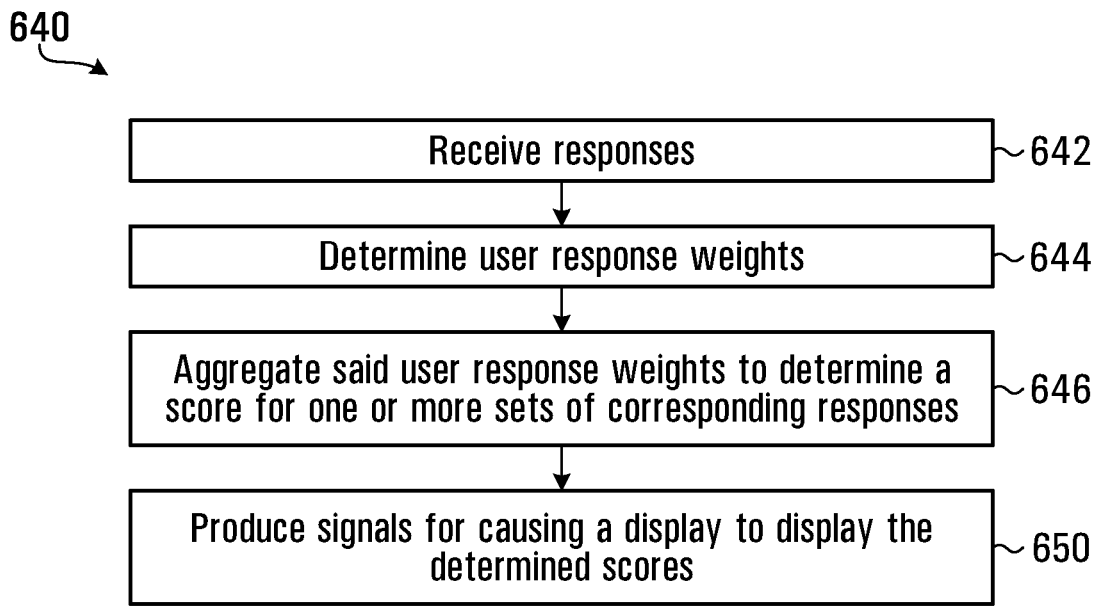
FIG. 26 is a flowchart depicting blocks of code for directing the server of the system of FIG. 1 to perform response analysis for an information request in accordance with an embodiment of the invention.

Referring to FIG. 26, there is shown at 640 a flowchart for directing the server processor 100 to perform response analysis for an information request. In various embodiments, the flowchart 640 may be encoded in the block of codes 120 of the program memory 102 and may be executed concurrently or integrated with the flowchart 200 shown in FIG. 5. In some embodiments, the flowchart 640 may be executed separately, without executing the flowchart 200 shown in FIG. 5.

The flowchart 640 begins with block 642 which directs the server processor 100 to receive responses. In some embodiments, the code included in block 642 may include code as depicted in the flowchart 220 shown in FIG. 7. In one embodiment, block 642 may direct the server processor 100 to execute blocks 222, 224, 226, and 228 of the flowchart 220 generally as described above having regard to FIG. 7 and the second user using the second user device 16 may cause the second user device processor 160 to execute blocks of code depicted in a flowchart 651 shown in FIG. 27, which may be included in the data processing application block of code of the program memory 162 of the second user device 16. The flowchart 651 includes blocks 652, 653, 654, 655, 656, and 657 generally similar to the blocks of the flowchart 282 shown in FIG. 8 and described above.

Figure 27:
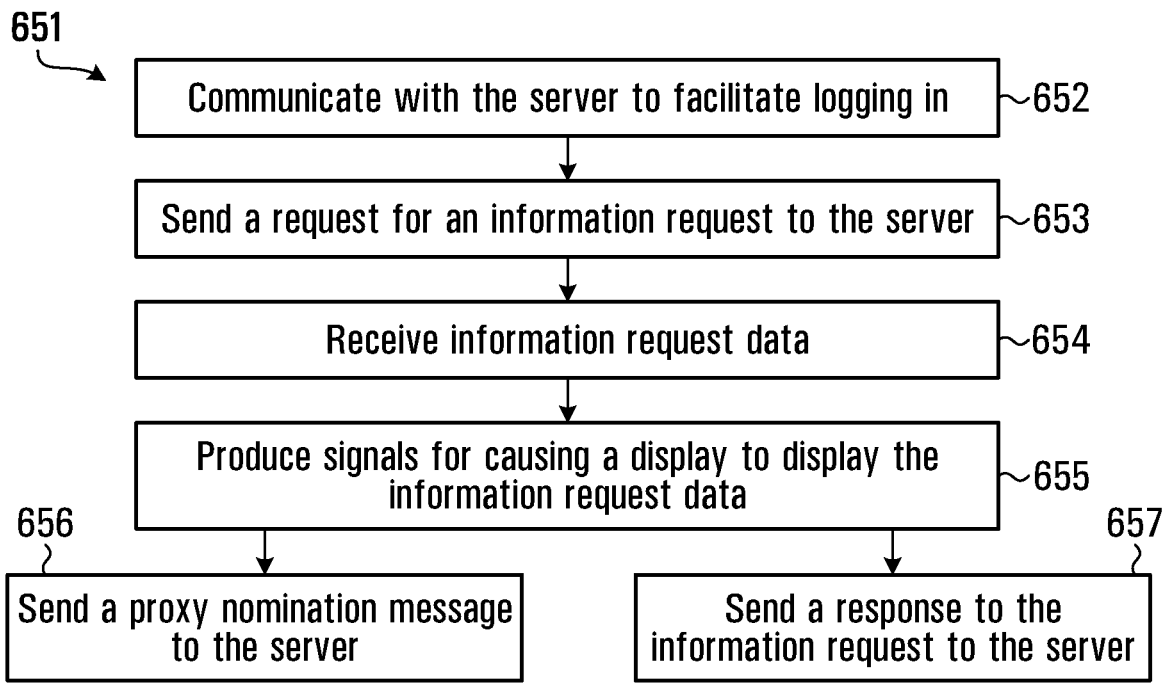
FIG. 27 is a flowchart depicting blocks of code for directing a user device of the system of FIG. 1 to facilitate processing of user provided information in accordance with an embodiment of the invention.

In some embodiments, the second user may select the proxy nomination link 382 of the webpage 380 generally as shown in FIG. 12 to trigger block 656 of the flowchart 651 shown in FIG. 27 which is generally similar to the block 292 of the flowchart 282 shown in FIG. 8 and the server processor 100 may execute block 230 of the flowchart 220. This may be followed by the server 12 updating one or more user assessment weights such by the server processor 100 executing block 206 of the flowchart 200 shown in FIG. 5, generally as described above.

In some embodiments, the second user may select the respond link 384 of the webpage 380 generally as shown in FIG. 12 (but in some embodiments reflecting an updated proxy count field value of 4 included in the information request record 350) and this may trigger execution of the block 657 of the flowchart 651. For example, in some embodiments, the second user using the second user device 16 may select the respond link 384 on the webpage 380 generally as shown in FIG. 12 to cause the second user device processor 160 to proceed to block 657, which directs the second user device processor 160 to send a response to the information request to the server 12.

In various embodiments, block 232 of the flowchart 220 shown in FIG. 7 may be triggered by and executed concurrently with or in cooperation block 657 and may direct the server processor 100 to facilitate reception and/or receive the response to the information request.

Figure 28:
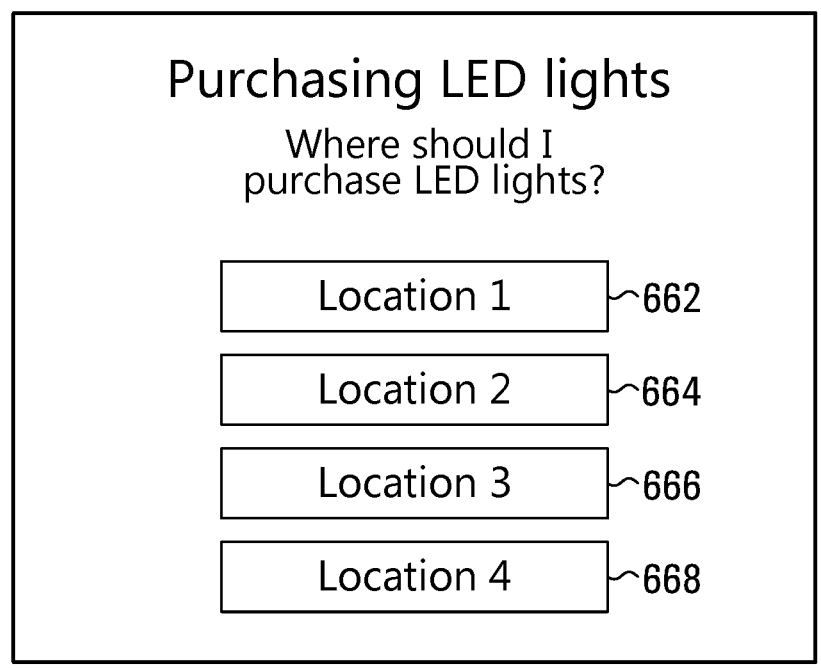
FIG. 28 is a representation of an exemplary window that may be displayed by a display of a user device of the system shown in FIG. 1.

Referring to FIG. 7, block 232 may include blocks of code which direct the server processor 100 to produce signals for causing the display 190 of the second user device 16 to display a window 660 including a plurality of response links 662, 664, 666, and 668 for selection, as shown in FIG. 28. In various embodiments, block 232 may direct the server processor 100 to retrieve the content for the response links 662, 664, 666, and 668 from the response fields 360, 362, 364, and 366 of the first information request record 350.

Figures 29, 30:
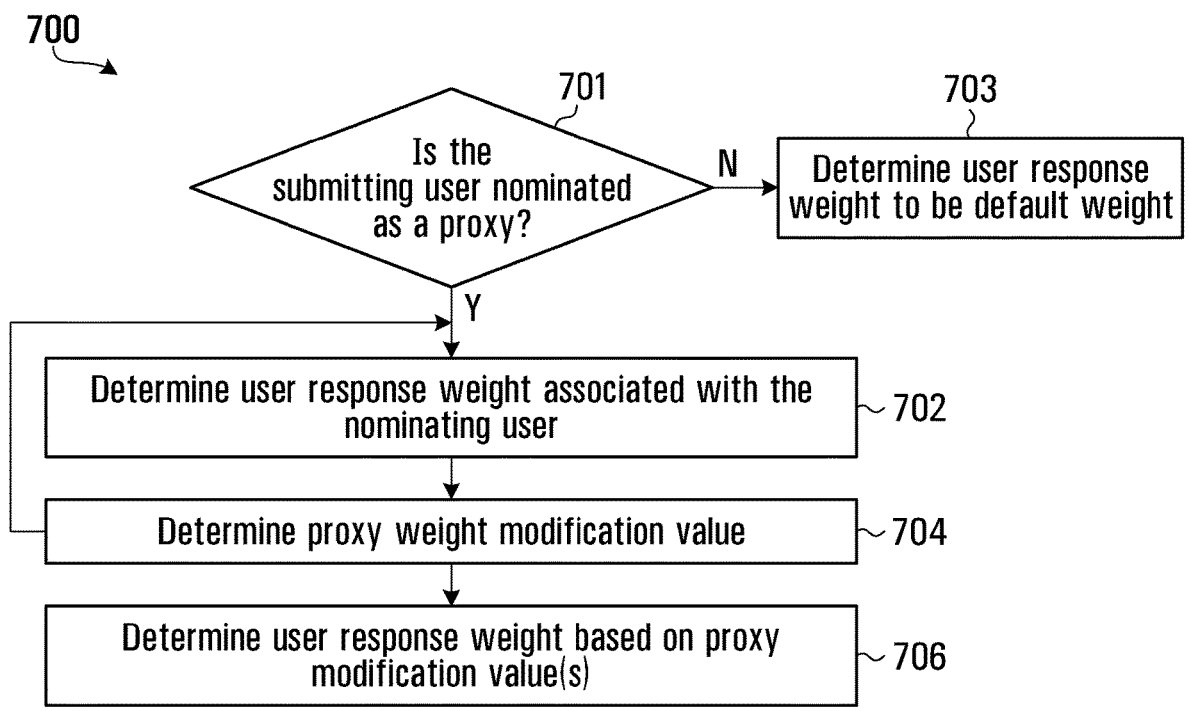
FIG. 29 is a representation of an exemplary response record that may be used in the system shown in FIG. 1.
FIG. 30 is a flowchart depicting blocks of code which may be included in the blocks of code shown in FIG. 26 in accordance with an embodiment of the invention.

Referring to FIG. 27, block 657 may direct the second user device processor 160 to receive input via the user input devices 62, the input representing selection of one of the plurality of responses. Block 294 may direct the first user device processor 40 to generate a response record 680 as shown in FIG. 29 based on which of the response links is selected by the user and to send a representation of the response record 680 to the server 12. Referring to FIG. 29, the response record 680 includes an information request identifier field 682 for storing an identifier identifying the information request for which the response is being submitted, a user identifier field 684 for storing an identifier which identifies the user who is providing the response and a response field 686 for storing a representation of the response provided. In some embodiments, block 657 may direct the second user device processor 160 to store a representation of the response record 680 in the location 189 of the storage memory 164.

Block 232 directs the server processor 100 to receive the representation of the response record 680 and to store a representation of the response record 680 in the location 138 of the storage memory 104.

Referring back to FIG. 26, in various embodiments, block 642 may direct the server processor 100 to receive a plurality of response records having the same format as the response record 680, for example by executing the blocks of the flowchart 220 shown in FIG. 7 a plurality of times. The response records may be received from a plurality of different users. Accordingly, in some embodiments, after block 642 has been executed there may be stored in the location 138 of the storage memory 104 a plurality of response records having generally the same format as the response record 680 shown in FIG. 29.

In some embodiments, an administrator may wish to determine scores for one or more responses or sets of responses received for a given information request. In some embodiments, upon submitting the information request to the server 12 the administrator may have provided a value for an expiry date to indicate a date and time at which the server 12 is to be triggered to determine the scores for the responses or sets of responses based on the responses which have been received. As discussed above, the server 12 may store the expiry date for an information request in an expiry date field of the information request record. For example, the first information request record 350 shown in FIG. 11 stores the expiry date in the expiry date field 368.

In some embodiments, a default expiry date may be set by the server 12 for each information request when the information request is submitted. For example, the server 12 may be configured to cause each information request record to include an expiry date that is a set period of time from the date of submission of the information request. For example, in some embodiments, the expiry date may be set to 7 days after the date of submission of the information request. In some embodiments, the period of time used by the server 12 may be set or amended by an admin user and may vary depending on the group or organization using the system 10.

Referring to FIG. 26, block 644 may be triggered when the server 12 determines that a current date is past an expiry date stored in an information request record. Block 644 directs the server processor 100 to determine user response weights for each user response provided in association with an information request, each of the user response weights associated with a user of the plurality of users and representing a weight to be applied to a response provided by the user.

In some embodiments, block 644 may direct the server processor 100 to review the proxy nomination records stored in the location 134 of the storage memory 104 to determine the user response weights. For example, if a submitting user has not been nominated as a proxy user, block 644 may direct the server processor 100 to determine the user response weight to be a default value. If a responding user has been nominated as a proxy user, block 644 may direct the server processor 100 to determine a higher response weight for the user than if the user had not been nominated as a proxy user.

In some embodiments, a determined user response weight for a user who has been nominated as a proxy user may be greater than the sum of the nominating user's user response weight and what would have been the proxy user's user response weight had they not been nominated. As stated above, this may facilitate more accurate scoring of responses, since in some cases it may be assumed that a user who has been nominated as a proxy may provide a more useful response than two users who have not been nominated proxies.

Referring to FIG. 30, there is shown a flowchart 700 depicting blocks of code which may be included in the block 644 of the flowchart 640 shown in FIG. 26 in various embodiments. Block 644 may direct the server processor to execute the blocks of code shown in FIG. 30 for each user response record stored in the location 138 of the storage memory 104 and associated with a particular information request for which block 644 has been triggered.

The flowchart 700 begins with block 701 which directs the server processor 100 to determine whether the user who submitted the response was nominated as a proxy for responding to the subject information request. For example, block 701 may direct the server processor 100 to read the information request identifier field 682 and the user identifier field 684 of the response record 680 of the submitting user from the location 138 of the storage memory 104 and determine whether one or more proxy nomination records stored in the location 134 of the storage memory has a matching information request identifier and a matching user identifier stored in a proxy identifier field. If at block 701 it is determined that the submitting user was nominated for responding to the information request, the server processor 100 is directed to continue at block 702.

For example, in one embodiment, the proxy nomination record 420 shown in FIG. 14 may be stored in the location 134 of the storage memory and the proxy nomination record 420 includes an information request identifier and proxy user identifier which correspond to the information request identifier and submitting user identifier of the response record 680 and so block 701 may direct the server processor to determine that the submitting user for the response record 680 was nominated as a proxy and the server processor 100 may be directed to block 702.

Referring to FIG. 30, block 702 directs the server processor 100 shown in FIG. 4 to determine a user response weight associated with the nominating user identified by the proxy nomination record 420 found at block 701. Block 702 may direct the server processor 100 to read the nominating user identifier field 426 of the proxy nomination record 420 found at block 701 and to execute blocks of code generally similar to those included in the flowchart 700, but looking at the nominating user, instead of the submitting user, to determine a user response weight for the nominating user identified by the nominating user identifier field 426.

Accordingly, block 702 may direct the server processor 100 to execute a block generally similar to the block 701 of the flowchart 700 to determine whether the nominating user was nominated as a proxy for the subject information request. If so, the server processor 100 may be directed to execute another block similar to block 702 to determine a user response weight for a further nominating user which nominated the nominating user. Execution of flowcharts generally similar to the flowchart 700 shown in FIG. 30 may thus be performed recursively until a user is found which was not nominated as a proxy user. Once such a user is found, a block similar to the block 703 may be executed to determine a user weight for such a user to be a default value. In various embodiments, the default value may be 1.0, for example.

In some embodiments, the nominating user identified by the user identifier stored in the nominating user identifier field 426 of the proxy nomination record 420 may not have been nominated as a proxy and so block 702 may direct the server processor 100 to execute a block similar to the block 703 to determine a user response weight associated with the nominating user to be the default value of 1.0.

Referring to FIG. 30, after block 702 has been executed, block 704 then directs the server processor 100 to determine a proxy weight modification value for the proxy user. In some embodiments, block 704 may direct the server processor 100 to derive the proxy weight modification value as a sum of the user response weight associated with the nominating user and one or more modifiers.

In some embodiments, block 704 may direct the server processor to determine each of the one or modifiers for the proxy user based on a function of a respective modifier determined for the nominating user.

In some embodiments, block 704 may direct the server processor 100 to set a modifier for the proxy user to a default value if the nominating user was not nominated and therefore was not associated with a modifier. The value of the default value may be previously set by an admin user of the system 10. In some embodiments, for example, the default value may be set to 0.4.

In some embodiments, the nominating user may not have been nominated as a proxy and so, block 704 may direct the server processor to determine that the nominating user was not nominated as a proxy and to set the modifier value for the proxy user to the default value of 0.4.

Block 704 may then direct the server processor 100 to derive the proxy weight modification value as a sum of the user response weight associated with the nominating user and the modifier determined for the proxy user. Accordingly, where the nominating user was not nominated as a proxy and therefore had a default user response weight of 1.0, in some embodiments, block 704 may direct the server processor 100 to determine the proxy weight modification value to be equal to 1.0+0.4=1.4.

In some embodiments, a user may have been nominated as a proxy by more than one nominating user and blocks 702 and 704 may be repeated for each proxy nomination that the user has received to determine one or more additional proxy weight modification values. For example, blocks 702 and 704 may be executed for each proxy nomination record stored in the location 134 of the storage memory 104 that includes an information request identifier and a proxy identifier that match the information request identifier and submitting user identifier of the response record 680.

Block 706 then directs the server processor 100 to determine a user response weight based on the one or more proxy modification values determined at blocks 702 and 704. In some embodiments, block 706 may direct the server processor 100 to set the user response weight to equal the sum of the default value for a user response weight (i.e., 1.0 in some embodiments) and the proxy modification values determined at the one or more iterations of block 704. For example, where only one proxy nomination record was found and blocks 702 and 704 were executed for the proxy nomination record 420 and the proxy modification value was found to be 1.4, block 706 may direct the server processor 100 to set the user response weight to the sum of 1.4+1.0=2.4

Referring to FIG. 30, block 706 may direct the server processor 100 shown in FIG. 4 to store the user response weight in association with the response record for which it was derived. For example, in some embodiments, block 706 may direct the server processor 100 to update the response record 680 to include a user response weight field 688 as shown in FIG. 31 for storing the user response weight determined at block 706.

Accordingly, in view of the foregoing, the user response weight for the proxy user may be greater than the total user response weight that would be assigned to the proxy user and the nominating user combined, had the nominating user not nominated the proxy user. In some embodiments, this additional weight may reflect the additional expertise and knowledge that the proxy user may be expected to have in view of the proxy user having been nominated as a proxy.

While the above describes how flowchart 700 may be executed in accordance with various embodiments of the invention where the nominating user was not nominated as a proxy, in some embodiments, the nominations of proxy users may chain through various nominating users. For example, in some embodiments, the nominating user may act as a first nominating user and may have been nominated as a proxy by a second nominating user.

Referring again to FIG. 30, in such embodiments, block 702 may direct the server processor 100 to execute a flowchart generally similar to the flowchart 700 to determine the user response weight associated with the first nominating user. In such embodiments, a block generally similar to the block 702 of the flowchart 700 shown in FIG. 30 may direct the server processor 100 to determine a user response weight associated with the second nominating user.

For example, the block generally similar to the block 702 may direct the server processor 100 to determine a user response weight of 1.0 for the second nominating user. A block generally similar to the block 704 may then direct the server processor 100 to determine a proxy weight modification value for the first nominating user by first determining a modifier of 0.4 and then, generally as described above, determining a proxy modification value of 1.4. Next a block generally similar to the block 704 may direct the server processor 100 to determine a user response weight for the first nominating user, generally as described above, such that the server processor 100 is directed to find the user response weight as 1.0+1.4=2.4.

Accordingly, referring back to FIG. 30, block 702 may direct the server processor 100 to determine a user response weight associated with the first nominating user of 2.4. Block 704 may then direct the server processor 100 to determine one or more modifiers for the proxy user, each of the modifiers based on a respective function of a modifier associated with the first nominating user. Accordingly, for each modifier associated with the first nominating user, block 704 may direct the server processor 100 to determine a modifier to be associated with the proxy user.

In some embodiments, block 704 may direct the server processor 100 to set each modifier for the proxy user to a value that is greater than the respective modifier associated with the nominating user. In some embodiments, the modifiers for the proxy user being greater than the modifiers for the nominating user may help represent an increased value in a user's opinions when the user has been nominated by another user who was already nominated as a proxy.

For example, block 704 may direct the server processor 100 to set each modifier for the proxy user to a value equal to Mn+f(Mn) where Mn represents a respective nth modifier determined for the nominating user.

In some embodiments, f(Mn) may decrease as Mn increases. For example, f(Mn) may approach 0 as Mn approaches a limit value. For example, in one embodiment, an administrator may configure the server 12 such that block 704 directs the server processor 100 to define f(Mn) as K*(L−Mn) where K is a user definable parameter between 0 and 1 and L is a user definable limit. The values used for K and L may vary depending on an organization or group's goals and so these parameters may be set by an administrator of the system 10. In one embodiment, for example, K may be set to 0.6 and L may be set to 0.5 and so f(Mn) may be defined as follows 0.6*(0.5−Mn).

Accordingly, where the modifier for the first nominating user was previously determined to be 0.4, block 704 may direct the server processor 100 to set a modifier for the proxy user to 0.4+f(0.4)=0.4+0.06=0.46. Accordingly block 704 may direct the server processor 100 to set the modifier for the proxy user to 0.46. Block 704 may then direct the server processor 100 to set the proxy modification value to 2.4+0.46=2.86.

Block 706 may then direct the server processor 100 to determine the user response weight based on the proxy modification value by setting the user response weight for the proxy user to 1.0+2.86=3.86

In some embodiments, it may be desirable for the function f(Mn) to approach 0 as Mn approaches a limit value to avoid a continually transferred vote or modifier approaching a value of infinity. In various embodiments, for different groups or organizations having different political beliefs, for example, an administrator may set the function f(Mn) or enhancement to each subsequent vote transfer as a custom convergent function.

For example, in some embodiments, upon a first transfer or proxy nomination for a vote or assessment, the user assessment weight may start at 1 then go to 1.05 on the first proxy nomination and 1.07 on the second proxy nomination (with a top limit of 1.1). If a group were more liberal the top limit might be 1.4, for example. In the example provided above, the top limit is 1.5. In some embodiments, values for parameters used to determine the modifier may be determined experimentally based on what may be a good fit for each group or organization throughout its life cycle.

While the above example describes an embodiment where there is a proxy user nominated by a first nominating user who is in turn nominated by a second nominating user, in various embodiments, such a chain may include a plurality of nominating users. For example, in various embodiments, the second nominating user may have been nominated as a proxy user and/or the nominator of the second nominating user may also have been nominated as a proxy user. Accordingly, in various embodiments, not only may an original vote or assessment be transferred, but also an original vote or assessment may be passed throughout a plurality of users in the network using a plurality proxy nominations.

As discussed above, execution of block 644 of the flowchart 640 shown in FIG. 26 may involve executing the blocks of code of the flowchart 700 for each response record associated with a particular information request. Accordingly, in various embodiments, after block 644 has been executed, a plurality of response records having corresponding information request identifiers may be updated to include respective user response weight fields.

Referring to FIG. 26, block 646 then directs the server processor 100 shown in FIG. 4 to aggregate the user response weights to determine a score for a set of corresponding responses. In various embodiments, a set of corresponding responses may include responses which are associated with response records having a substantially similar response stored in the response field. For example, in various embodiments, response records which include a response field storing a value of "Location 1" may be considered to represent corresponding responses.

Referring to FIG. 26, block 646 may direct the server processor 100 shown in FIG. 4 to read user response records from the location 138 of the storage memory 104 and aggregate or sum user response weights from the user response weight fields of corresponding response records to determine a score for each set of corresponding responses. In some embodiments, block 646 may direct the server processor 100 to store the scores in association with the information requests in the storage memory 104. For example, block 646 may direct the server processor 100 to update the first information request record 350 to include response score fields 361, 363, 365, and 367 associated with each of the response fields 360, 362, 364, and 366 as shown in FIG. 32 and to store the scores in the response score fields.

Figure 33:
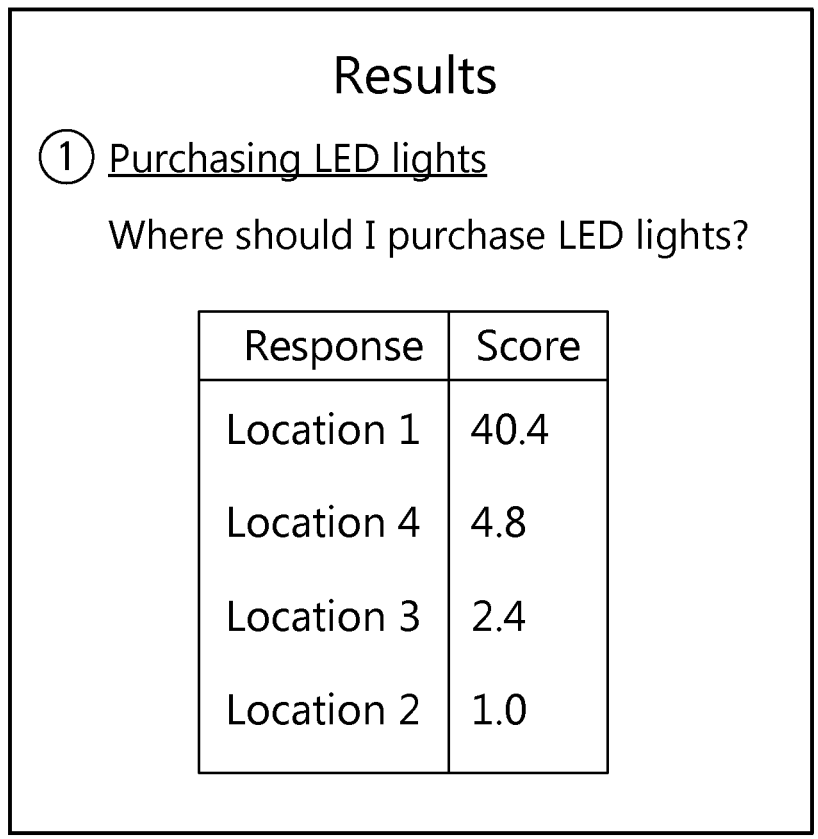
FIG. 33 is a representation of an exemplary window that may be displayed by a display of a user device of the system shown in FIG. 1.

Referring to FIG. 26, in some embodiments, the flowchart 640 may end after block 646. In some embodiments, the flowchart 640 includes block 650 which directs the server processor 100 shown in FIG. 4 to produce signals for causing a display to act as a response score display and display the determined scores. For example, in various embodiments, a user using one of the user devices may select a results link 306 of the webpage shown in FIG. 10 and block 650 may direct the server processor 100 to produce signals for causing a user device display to display a results window 720 as shown in FIG. 33 including data taken from an information request record that has been processed and includes response score fields. In the embodiment shown, the results window 720 includes representations of data taken from the first information request record 350 as shown in FIG. 32. In various embodiments, block 650 may direct the server processor 100 to produce signals for causing the window 720 to depict the responses of the first information request record 350 in order based on respective associated response scores taken from the response score fields 361, 363, 365, and 367 of the first information request record 350.

Determining Assessment Weights

As discussed above, in some embodiments, blocks 454 and 456 of the flowcharts 450 and 455 respectively may direct the server processor 100 to determine user assessment weights using a formula generally as described above, such as the following formula:

$$W = A*P + B*N + C*Ex + D*En + 1.0$$

where W is the user assessment weight, A, B, C, and D are each constants that may be set by an administrator, is a proxy count, N is a nominator count, Ex is an experience value, and En is an engagement value.

In some embodiments, as discussed above, the proxy count and/or the nominator count may be initially set to 0 and incremented or increased b the server 12 when proxy nominations are made.

In some embodiments, the experience value stored in an experience field of a user record stored in the location 130 of the storage memory 104 may be set by an administrator of the system 10, for example, using one of the user devices 13 shown in FIG. 1.

In some embodiments, the experience value may be set to a number between 0 and 1.0, which may be determined or derived from a user's formal position in the group or organization. For example, in some embodiments, a CEO of an organization may be given an experience value of 1.0 and an intern may be given an experience value of 0.1.

In some embodiments, the experience value may be determined based in part on how long a user has been with the group or organization. For example, in some embodiments, an administrator may set the experience value such that it is increased by 0.1 for each 5 years that a user has been with the organization.

The value for C may be set by an administrator. For example, in various embodiments C may be set between 0 and 10. Experience may be valued differently in different organizations. For example in a large established group or company, brand may be more powerful than anything and people may not matter as much to the success of the organization relatively. As such, the group might not see the value in experience and maintain a low value of the constant C associated with experience, such as, for example a value of 1.

In some embodiments, the engagement value may be initialized at registration to a value of 0 and may be increased or incremented by an increaser (0.1, for example), whenever a user engages with the system 10. The engagement value may be decreased periodically (e.g. every day) by a decreaser (e.g. 0.1, for example) such that the user may need to keep up engagement to keep a high engagement value. A user may be considered to engage with the system when the user submits a comment, submits an information module, submits an information request, responds to an information request, nominates a proxy for responding to an information request, and/or submits an information module assessment, for example.

Engagement may be valued differently by different organizations. In some embodiments, the system 10 may be configured to establish a benchmark for each individual's usage (say after 1 year of use on a per year basis), then compare year 2 to year 1 to establish engagement. This may help to smooth the measurement of engagement equally for introverts and extroverts. In some embodiments, the administrator may need to start somewhere for the first year, so the administrator may pick values for an increaser and decreaser based on an expected engagement that aligns with the job duty and personality. In some embodiments, if a user is at the expected engagement level, the engagement value may stay at around 0.

Figure 34:
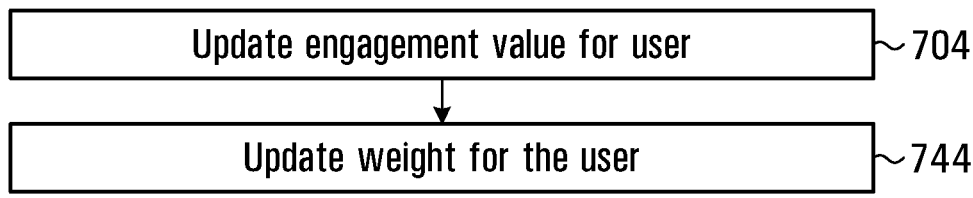
FIG. 34 is a flowchart depicting blocks of code for directing the server of the system of FIG. 1 to perform engagement value updating in accordance with an embodiment of the invention.

In some embodiments, a flowchart 740 shown in FIG. 34 may be included in the block of codes 120 of the program memory 102 of the server 12 in accordance with one embodiment. The flowchart 740 or blocks of code generally similar to the flowchart 740 may be executed for a user when the user submits a comment, submits an information module, submits an information request, responds to an information request, nominates a proxy for responding to an information request, and/or submits an information module assessment, for example The flowchart 740 begins with block 742 which directs the server processor 100 to update an engagement value for a user. In various embodiments, for example, where the flowchart 740 was triggered by the second user associated with the second user record 480 shown in FIG. 18 submitting a response, block 742 may direct the server processor 100 to increase the value stored in the engagement value field 492 of the second user record 480. For example, block 742 may direct the server processor 100 to increment the value stored in the engagement value field by 0.1.

Block 744 then directs the server processor 100 to update a weight for the user. In some embodiments, block 744 may direct the server processor 100 to update the user assessment weight stored in the user assessment weight field 486 of the second user record 480. For example, block 744 may direct the server processor 100 to set the user assessment weight using a formula generally as described above, such as the following:

$$W = A*P + B*N + C*Ex + D*En + 1.0$$

where W is the user assessment weight, A, B, C, and D are each constants that may be set by an administrator, P is a proxy count, N is a nominator count, Ex is an experience value, and En is an engagement value.

In some embodiments, the block 206 of the flowchart 200 may include blocks of code generally similar to those included in the flowchart 740 shown in FIG. 34, for directing the server processor 100 to increment the value stored in the engagement value field 270 of the user record 250 associated with the nominating user and update the user assessment weight based on the incremented engagement value stored in the engagement value field, using the formula described above, for example.

In some embodiments, the block 232 and/or block 230 of the flowchart 220 shown in FIG. 7 may include blocks of code generally similar to those included in the flowchart 740 shown in FIG. 34, for directing the server processor 100 to increment the value stored in the engagement value field of a user record associated with a responding user and update the user assessment weight based on the incremented engagement value stored in the engagement value field, using the formula described above, for example.

In some embodiments, block 232 and/or block 230 may direct the server processor 100 to change the amount by which an engagement value is increased based on how long it takes for a user to respond to, or nominate a proxy user for responding to, an information request. For example, where a response is received more quickly, the engagement value may be increased by a greater amount.

The value for D may be set by an administrator. In some embodiments, for example, D may be set between 0 and 1 for example. In some embodiments, D may be set to a value of 0.1 for example.

In various embodiments, the values chosen for the constants A, B, C, and D may be determined by an administrator. For example, in some embodiments, the choice of values may depend on the group or organization's position between the right and left political spectrum and/or the best fit for the size of the group and evolutionary stage. In various embodiments, any or all of the constants A, B, C, and D may be set to 0.

VARIOUS EMBODIMENTS

While embodiments of the invention described above involve using a data processing application with web browser functionality to display webpages and/or windows which may act as graphical user interfaces, in various embodiments other user interfaces provided by other applications or devices, such as for example, one or more dedicated applications running on one or more devices, may be used.

As discussed above, in some embodiments, user assessments other than simply Boolean "likes" may be used. For example, in some embodiments, users may provide a rating which may be a number between a minimum value and a maximum value, such as between 0 and 5, for example. Thus, the information module assessment record sent to the server may include a rating field for storing the rating provided by the user. Block 212 of the flowchart 200 shown in FIG. 5 may direct the server processor 100 to generate a weighted assessment based on the rating and the user assessment weight of the user who provided the rating. For example, block 212 of the flowchart 200 shown in FIG. 5 may direct the server processor 100 to generate the weighted assessment by scaling or multiplying the rating by a user assessment weight associated with the user who provided the rating.

While the flowchart 200 depicted in FIG. 5 may provide a broad overview of the functionality of the system 10 in accordance with one embodiment of the invention, in various embodiments, various blocks of the flowchart 200 may be executed in different order, separately, and/or concurrently. For example, in various embodiments, block 202 or a portion thereof may be executable when a user is registered in the system 10, blocks 204 and 206 may be executable whenever a user wishes to provide a proxy nomination message and in some embodiments blocks 208-214 may be executable when a user wishes to provide an information module assessment. Further, block 216 may be executable when a user wishes to browse, search and/or view the information modules.

While some of the flowcharts herein include blocks of code for facilitating logging in of users, in various embodiments, these blocks may be omitted and/or altered. For example, in some embodiments, the blocks of code for facilitating logging in of a user may be omitted if a user is already logged in to the system.

In various embodiments, weight values, such as the user assessment weight values and/or user response weight values generated and/or stored in memory may be inverted before being applied to determine aggregated weighted assessments or scores. In such embodiments, the user assessment weight values and/or user response weights may be stored generally as inverted values to those described above. Accordingly, in some embodiments, for example, block 206 may direct the server processor 100 to decrease the user assessment weight value associated with the proxy user.

In some embodiments, the modifiers described above and determined at block 704 of the flowchart 700 shown in FIG. 30 may be set to 0 for all cases, such that the system 10 facilitates proxy voting.

In some embodiments, if a user quits or leaves the group or company, the system 10 may be configured to remove the user's contribution.

In various embodiments, the system 10 or a system generally similar to the system 10 may be used for any or all of the following applications, for example:

A type of Microsoft™ word that is collaborative using the proxy structure.

A type of wikipage.

A specialized search engine and organic development of a product.

A financial tool for accountants and economists.

A type of organization voting structure, not just a database builder.

An HR analytics tool where administration can keep an eye on any modification to the user assessment weights or reputation scores.

A tax tool that may help facilitate better assessment and quantification of a company or group's intangible assets.

A tool for assessing financial credit based on an individual's user assessment weight. For example, in some embodiments, the higher the user assessment weight, the easier it may be to get credit.

An advertising tool that may be configured to give money to a specific user for viewing an advertisement, wherein the amount of money provided may be based on the user assessment weight.

While specific embodiments of the invention have been described and illustrated, such embodiments should be considered illustrative of the invention only and not as limiting the disclosure as construed in accordance with the accompanying claims.

The series of paragraphs below recites various illustrative combinations of features of the present disclosure. These paragraphs are intended to represent a non-limiting presentation of suitable combinations, and are alphanumerically designated for clarity and efficiency:

A0. A computer-implemented method of processing user provided information from a plurality of users in a digital network for ranking one or more information modules, the method comprising:

causing at least one processor to store in memory respective user assessment weights, each of the user assessment weights associated with a user of the plurality of users and representing a weight to be applied to information module assessments;

causing the at least one processor to receive a proxy nomination message including a proxy user identifier identifying a proxy user that a nominating user of the plurality of users wishes to act as a proxy in providing information;

causing the at least one processor to change the user assessment weight associated with the proxy user based on said proxy nomination message;

causing the at least one processor to, for one or more information modules of the plurality of information modules:

receive information module assessments, each of the information module assessments associated with a user of the plurality of users;

generate weighted assessments, each of said weighted assessments based on one of the information module assessments received and a user assessment weight associated with a user associated with the information module assessment; and aggregate said weighted assessments to generate an aggregated weighted assessment associated with the information module; and causing the at least one processor to rank a set of the plurality of information modules based at least in part on the aggregated weighted assessments.

A1. The method of A0 further comprising causing the at least one processor to produce signals for causing at least one ranking display to display said set of the plurality of information modules in an order based on the ranking.

A2. The method of A0 or A1, wherein causing the at least one processor to update the user assessment weight associated with the proxy user comprises causing the at least one processor to increase the user assessment weight associated with the proxy user.

A3. The method of any one of paragraphs A0 through A2, further comprising causing the at least one processor to update the user assessment weight associated with the nominating user based on said proxy nomination message.

A4. The method of any one of paragraphs A0 through A3, further comprising causing the at least one processor to, for each of the plurality of users: determine the user assessment weight value for the user based on an experience value representing a formal position of the user.

A5. The method of any one of paragraphs A0 through A4, further comprising causing the at least one processor to receive a search query and wherein causing the at least one processor to rank the set of the plurality of information modules comprises causing the at least one processor to rank the set of the plurality of information modules based at least in part on the search query.

A6. The method of any one of paragraphs A0 through A5 further comprising:

causing the at least one processor to receive a plurality of responses to the inquiry, each of the responses associated with one of the plurality of users, wherein the plurality of responses comprise one or more sets of corresponding responses; and causing the at least one processor to determine a score for each set of corresponding responses.

A7. The method of A6, further comprising causing the at least one processor to, for each of the responses received:

update a user engagement value for the user associated with the response; and determine the user assessment weight value for the user associated with the response based on the updated user engagement value.

A8. The method of A6 or A7, further comprising causing the at least one processor to determine user response weights, each of the user response weights associated with a user of the plurality of users and representing a weight to be applied to a response to the inquiry provided by the user, said user response weight associated with the proxy user determined based on said proxy nomination message;

wherein causing the at least one processor to determine the score for each set of corresponding responses comprises aggregating user response weights associated with corresponding responses.

A9. The method of A8, further comprising causing the at least one processor to produce signals for causing at least one response score display to display a representation of the scores.

A10. The method of A8 or A9, wherein causing the at least one processor to determine the user response weight associated with the proxy user comprises causing the at least one processor to determine a proxy weight modification value.

A11. The method of A10, wherein causing the at least one processor to determine the proxy weight modification value comprises causing the at least one processor to determine a user response weight associated with the nominating user and causing the at least one processor to derive the proxy weight modification value from the determined user response weight associated with the nominating user.

A12. The method of A11, wherein causing the at least one processor to derive the proxy weight modification value comprises: causing the at least one processor to set the proxy weight modification value to a sum of the user response weight associated with the nominating user and a proxy modifier.

A13. The method of A12, further comprising causing the at least one processor to determine a nominator modifier associated with the nominating user and causing the at least one processor to derive the proxy modifier based on the nominator modifier.

A14. The method of A13, wherein the proxy modifier is greater than the nominator modifier.

A15. The method of any one of paragraphs A0 through A14, further comprising causing the at least one processor to produce signals representing an information request for causing at least one information request display to present the information request to the nominating user and wherein the proxy user identifier of the proxy nomination message identifies the proxy user as a user that the nominating user of the plurality of users wishes to act as a proxy for the nominating user for responding to the information request.

A16. The method of any one of paragraphs A0 through A15, further comprising causing the at least one processor to produce signals for causing a proxy nomination to be stored in memory, said proxy nomination including an identification of the proxy user and an identification of the nominating user and representing the nomination of the proxy user by the nominating user.

B0. An apparatus for processing user provided information from a plurality of users in a digital network for ranking one or more information modules, the apparatus comprising at least one processor configured to:

store in memory respective user assessment weights, each of the user assessment weights associated with a user of the plurality of users and representing a weight to be applied to information module assessments;

receive a proxy nomination message including a proxy user identifier identifying a proxy user that a nominating user of the plurality of users wishes to act as a proxy in providing information;

change the user assessment weight associated with the proxy user based on said proxy nomination message;

for one or more information modules of the plurality of information modules:
receive information module assessments, each of the information module assessments associated with a user of the plurality of users;
generate weighted assessments, each of said weighted assessments based on one of the information module assessments received and a user assessment weight associated with a user associated with the information module assessment; and
aggregate said weighted assessments to generate an aggregated weighted assessment associated with the information module; and
rank a set of the plurality of information modules based at least in part on the aggregated weighted assessments.

B1. The apparatus of B0, wherein the at least one processor is configured to produce signals for causing at least one ranking display to display said set of the plurality of information modules in an order based on the ranking.

B2. The apparatus of B0 or B1, wherein the at least one processor is configured to update the user assessment weight associated with the proxy user by increasing the user assessment weight associated with the proxy user.

B3. The apparatus of any one of paragraphs B0 through B2, wherein the at least one processor is configured to update the user assessment weight associated with the nominating user based on said proxy nomination message.

B4. The apparatus of any one of paragraphs B0 through B3, wherein the at least one processor is configured to, for each of the plurality of users: determine the user assessment weight value for the user based on an experience value representing a formal position of the user.

B5. The apparatus of any one of paragraphs B0 through B4, wherein the at least one processor is configured to receive a search query and wherein the at least one processor is configured to rank the set of the plurality of information modules by ranking the set of the plurality of information modules based at least in part on the search query.

B6. The apparatus of any one of paragraphs B0 through B5, wherein the at least one processor is configured to:
receive a plurality of responses to the inquiry, each of the responses associated with one of the plurality of users, wherein the
plurality of responses comprise one or more sets of corresponding responses; and
determine a score for each set of corresponding responses.

B7. The apparatus of B6, wherein the at least one processor is configured to, for each of the responses received:
update a user engagement value for the user associated with the response; and
determine the user assessment weight value for the user associated with the response based on the updated user engagement value.

B8. The apparatus of B6 or B7, wherein the at least one processor is configured to:
determine user response weights, each of the user response weights associated with a user of the plurality of users and representing a weight to be applied to a response to the inquiry provided by the user, said user response weight associated with the proxy user determined based on said proxy nomination message;
wherein the at least one processor is configured to determine the score for each set of corresponding responses by aggregating user response weights associated with corresponding responses.

B9. The apparatus of B8, wherein the at least one processor is configured to produce signals for causing at least one response score display to display a representation of the scores.

B10. The apparatus of B8 or B9, wherein the at least one processor is configured to determine the user response weight associated with the proxy user by determining a proxy weight modification value.

B11. The apparatus of B10, wherein the at least one processor is configured to determine the proxy weight modification value by determining a user response weight associated with the nominating user and deriving the proxy weight modification value from the determined user response weight associated with the nominating user.

B12. The apparatus of B11, wherein the at least one processor is configured to derive the proxy weight modification value by setting the proxy weight modification value to a sum of the user response weight associated with the nominating user and a proxy modifier.

B13. The apparatus of B12, wherein the at least one processor is configured to determine a nominator modifier associated with the nominating user and derive the proxy modifier based on the nominator modifier.

B14. The apparatus of B13, wherein the proxy modifier is greater than the nominator modifier B15. The apparatus of any one of paragraphs B0 through B14, wherein the at least one processor is configured to produce signals representing an information request for causing at least one information request display to present the information request to the nominating user and wherein the proxy user identifier of the proxy nomination message identifies the proxy user as a user that the nominating user of the plurality of users wishes to act as a proxy for the nominating user for responding to the information request.

B16. The apparatus of any one of paragraphs B0 through B15, wherein the at least one processor is configured to produce signals for causing a proxy nomination to be stored in memory, said proxy nomination including an identification of the proxy user and an identification of the nominating user and representing the nomination of the proxy user by the nominating user.

C0. A system for processing user provided information from a plurality of users in a digital network for ranking one or more information modules, the system comprising:
means for storing in memory respective user assessment weights, each of the user assessment weights associated with a user of the plurality of users and representing a weight to be applied to information module assessments;
means for receiving a proxy nomination message including a proxy user identifier identifying a proxy user that a nominating user of the plurality of users wishes to act as a proxy in providing information;
means for changing the user assessment weight associated with the proxy user based on said proxy nomination message;
means for, for one or more information modules of the plurality of information modules:
receiving information module assessments, each of the information module assessments associated with a user of the plurality of users;
generating weighted assessments, each of said weighted assessments based on one of the information module assessments received and a user assessment weight associated with a user associated with the information module assessment; and aggregating said weighted assessments to generate an aggregated weighted assessment associated with the information module; and means for ranking a set of the plurality of information modules based at least in part on the aggregated weighted assessments.

C1. The system of C0, further comprising means for causing at least one ranking display to display said set of the plurality of information modules in an order based on the ranking.

C2. The system of C0 or C1, wherein the means for updating the user assessment weight associated with the proxy user comprises means for increasing the user assessment weight associated with the proxy user.

C3. The system of any one of paragraphs C0 through C2, further comprising means for updating the user assessment weight associated with the nominating user based on said proxy nomination message.

C4. The system of any one of paragraphs C0 through C3, further comprising means for, for each of the plurality of users, determining the user assessment weight value for the user based on an experience value representing a formal position of the user.

C5. The system of any one of paragraphs C0 through C4, further comprising means for receiving a search query and wherein the means for ranking the set of the plurality of information modules comprises means for ranking the set of the plurality of information modules based at least in part on the search query.

C6. The system of any of paragraphs C0 through C5, further comprising:

means for receiving a plurality of responses to the inquiry, each of the responses associated with on of the plurality of users, wherein the plurality of responses comprise one or more sets of corresponding responses and means of determining a score for each set of corresponding responses.

C7. The system of C6, further comprising means for, for each of the responses received:

updating a user engagement value for the user associated with the response; and determining the user assessment weight value for the user associated with the response based on the updated user engagement value.

C8. The system of C6 or C7, further comprising means for determining user response weights, each of the user response weights associated with a user of the plurality of users and representing a weight to be applied to a response to the inquiry provided by the user, said user response weight associated with the proxy user determined based on said proxy nomination message, wherein the means for determining the score for each set of corresponding responses comprises means for aggregating user response weights associated with corresponding responses.

C9. The system of C8, further comprising means for causing at least one response score display to display a representation of the scores.

C10. The system of C8 or C9, further comprising means for determining the user response weight associated with the proxy user by determining a proxy weight modification value.

C11. The system of C10, wherein the means for determining the proxy weight modification value comprises means for determining a user response weight associated with the nominating user and means for deriving the proxy weight modification value from the determined user response weight associated with the nominating user.

C12. The system of C11, wherein the means for deriving the proxy weight modification value comprises means for setting the proxy weight modification value to a sum of the user response weight associated with the nominating user and a proxy modifier.

C13. The system of C12, further comprising means for determining a nominator modifier associated with the nominating user and means for deriving the proxy modifier based on the nominator modifier.

C14. The system of C13, wherein the proxy modifier is greater than the nominator modifier C15. The system of any one of paragraphs C0 through C14, further comprising means for producing signals representing an information request for causing at least one information request display to present the information request to the nominating user of the plurality of users wishes to act as a proxy for the nominating user for responding to the information request.

C16. The system of any one of paragraphs C0 through C15, further comprising means for producing signals for causing a proxy nomination to be stored in memory, said proxy nomination including an identification of the proxy user and an identification of the nominating user and representing the nomination of the proxy user by the nominating user.

D0. A computer readable medium having stored thereon codes which, when executed by at least one processor, cause the at least one processor to perform the method of any one of paragraphs A0 through A16.

The embodiments of the invention in which an exclusive property or privilege is claimed are defined as follows:

1. A computer-implemented method of providing ranked user-assessed information in response to a search query, the method comprising:

causing at least one processor to:

receive a search query;

store in memory respective user assessment weights, each of the user assessment weights associated with a user of a plurality of users;

receive a proxy nomination message including a proxy user identifier identifying a proxy user that a nominating user of the plurality of users wishes to act as a proxy in providing information;

based on said proxy nomination message, change the user assessment weight associated with the proxy user;

for each of one or more information modules of a plurality of information modules:

receive information module assessments, each of the information module assessments provided by a respective user of the plurality of users, the received information module assessments including an information module assessment provided by the proxy user;

weight each of the received information module assessments based on the stored user assessment weight of the user who provided the information module assessment; and aggregate the weighted assessments to generate an aggregated weighted assessment associated with the information module;

rank a set of the plurality of information modules based at least in part on the aggregated weighted assessments and on the received search query; and produce signals for causing at least one ranking display to display the ranked set of the plurality of information modules in an order based on the ranking.

2. The method of claim 1, wherein causing the at least one processor to change the user assessment weight associated with the proxy user comprises causing the at least one processor to increase the user assessment weight associated with the proxy user.

3. The method of claim 1, further comprising causing the at least one processor to update the user assessment weight associated with the nominating user based on said proxy nomination message.

4. The method of claim 1, further comprising causing the at least one processor to, for each of the plurality of users:
determine the user assessment weight for the user based on an experience value representing a formal position of the user.

5. The method of claim 1, further comprising:
causing the at least one processor to receive a plurality of responses to an inquiry, each of the responses associated with one of the plurality of users, wherein the plurality of responses comprise one or more sets of corresponding responses associated with similar user input;
causing the at least one processor to determine a score for each set of corresponding responses; and
causing the at least one processor to produce signals for causing at least one response score display to display a representation of the corresponding responses based on the determined scores.

6. The method of claim 5, further comprising causing the at least one processor to, for each of the responses received:
update a user engagement value for the user associated with the response; and
determine the user assessment weight for the user associated with the response based on the updated user engagement value.

7. The method of claim 5, further comprising
causing the at least one processor to determine user response weights, each of the user response weights associated with a user of the plurality of users and representing a weight to be applied to the response to the inquiry provided by the user, said user response weight associated with the proxy user being determined based on said proxy nomination message;
wherein causing the at least one processor to determine the score for each set of corresponding responses comprises aggregating user response weights associated with corresponding responses.

8. The method of claim 7, wherein causing the at least one processor to determine the user response weight associated with the proxy user comprises causing the at least one processor to determine a proxy weight modification value.

9. The method of claim 8, wherein causing the at least one processor to determine the proxy weight modification value comprises causing the at least one processor to determine a user response weight associated with the nominating user and causing the at least one processor to derive the proxy weight modification value from the determined user response weight associated with the nominating user.

10. The method of claim 9, wherein causing the at least one processor to derive the proxy weight modification value comprises:
causing the at least one processor to set the proxy weight modification value to a sum of the user response weight associated with the nominating user and a proxy modifier.

11. The method of claim 10, further comprising causing the at least one processor to determine a nominator modifier associated with the nominating user and causing the at least one processor to derive the proxy modifier based on the nominator modifier.

12. The method of claim 11, wherein the proxy modifier is greater than the nominator modifier.

13. The method of claim 1, further comprising causing the at least one processor to produce signals representing an information request for causing at least one information request display to present the information request to the nominating user and wherein the proxy user identifier of the proxy nomination message identifies the proxy user as a user that the nominating user of the plurality of users wishes to act as a proxy for the nominating user for responding to the information request.

14. The method of claim 1, further comprising causing the at least one processor to produce signals for causing a proxy nomination to be stored in memory, said proxy nomination including an identification of the proxy user and an identification of the nominating user and representing the nomination of the proxy user by the nominating user.

15. The method of claim 1, wherein each of the information modules includes information about purchasable products.

16. An apparatus for providing ranked user-assessed information in response to a search query, the apparatus comprising at least one processor configured to:
receive a search query;
store in memory respective user assessment weights, each of the user assessment weights associated with a user of a plurality of users;
receive a proxy nomination message including a proxy user identifier identifying a proxy user that a nominating user of the plurality of users wishes to act as a proxy in providing information;
change the user assessment weight associated with the proxy user based on said proxy nomination message;
for each of one or more information modules of a plurality of information modules:
receive information module assessments, each of the information module assessments provided by a respective user of the plurality of users, the received information module assessments including an information module assessment provided by the proxy user;
weight each of the received information module assessments based on the stored user assessment weight of the user who provided the information module assessment; and
aggregate said weighted assessments to generate an aggregated weighted assessment associated with the information module;
rank a set of the plurality of information modules based at least in part on the aggregated weighted assessments; and
produce signals for causing at least one ranking display to display the ranked set of the plurality of information modules in an order based on the ranking.

17. A system for providing ranked user-assessed information in response to a search query, the system comprising:
processing logic configured to receive a search query;
processing logic configured to store in memory respective user assessment weights, each of the user assessment weights associated with a user of a plurality of users;
processing logic configured to receive a proxy nomination message including a proxy user identifier identifying a proxy user that a nominating user of the plurality of users wishes to act as a proxy in providing information;

means for changing the user assessment weight associated with the proxy user based on said proxy nomination message;

processing logic configured to receive information module assessments for one or more information modules of a plurality of information modules, each of the information module assessments provided by a respective user of the plurality of users, the received information module assessments including an information module assessment provided by the proxy user;

means for weighting each of the received information module assessments based on the stored user assessment weight of the user who provided the information module assessment;

means for aggregating said weighted assessments to generate an aggregated weighted assessment associated with each information module of the one or more information modules;

means for ranking a set of the plurality of information modules based at least in part on the aggregated weighted assessments and on the received search query; and processing logic configured to cause at least one ranking display to display the ranked set of the plurality of information modules in an order based on the ranking.

18. A non-transitory computer readable medium having stored thereon codes which, when executed by at least one processor, cause the at least one processor to:

receive a search query;

store in memory respective user assessment weights, each of the user assessment weights associated with a user of a plurality of users;

receive a proxy nomination message including a proxy user identifier identifying a proxy user that a nominating user of the plurality of users wishes to act as a proxy in providing information;

change the user assessment weight associated with the proxy user based on said proxy nomination message;

for each of one or more information modules of a plurality of information modules:

receive information module assessments, each of the information module assessments provided by a respective user of the plurality of users, the received information module assessments including an information module assessment provided by the proxy user;

weight each of the received information module assessments based on the stored user assessment weight of the user who provided the information module assessment; and aggregate said weighted assessments to generate an aggregated weighted assessment associated with the information module;

rank a set of the plurality of information modules based at least in part on the aggregated weighted assessments and on the received search query; and cause at least one ranking display to display the ranked set of the plurality of information modules in an order based on the ranking.

19. The non-transitory computer readable medium of claim 18, wherein the codes, when executed by the at least one processor, further cause the at least one processor to:

receive a plurality of responses to an inquiry, each of the responses associated with one of the plurality of users, wherein the plurality of responses comprise one or more sets of corresponding responses associated with similar user input;

determine user response weights, each of the user response weights associated with a user of the plurality of users and representing a weight to be applied to the response provided by the user, the user response weight associated with the proxy user being determined based on said proxy nomination message, wherein:

determining the user response weight associated with the proxy user includes determining a proxy weight modification value;

determining the proxy weight modification value includes determining a user response weight associated with the nominating user and deriving the proxy weight modification value based on the determined user response weight associated with the nominating user; and deriving the proxy weight modification value includes:
determining a nominator modifier associated with the nominating user;
deriving a proxy modifier based on the nominator modifier, the proxy modifier being greater than the nominator modifier; and
setting the proxy weight modification value to a sum of the user response weight associated with the nominating user and the proxy modifier;

determine a score for each set of corresponding responses; and cause at least one response score display to display a representation of the corresponding responses based on the determined scores.

20. The non-transitory computer readable medium of claim 18, wherein the codes, when executed by the at least one processor, further cause the at least one processor to:

receive, from a mobile digital device of a user of the plurality of users, a photograph of a product; and add the photograph to a first information module, wherein the first information module is one of the one or more information modules for which an information module assessment is received, such that the ranked set of the plurality of information modules includes the first information modules.

21. The non-transitory computer readable medium of claim 20, wherein the one or more information modules for which an information module assessment is received further includes a second information module, the second information module including a link associated with a private network or an Internet-based third-party website.

* * * * *